United States Patent
Berini et al.

(10) Patent No.: US 7,043,134 B2
(45) Date of Patent: May 9, 2006

(54) THERMO-OPTIC PLASMON-POLARITON DEVICES

(75) Inventors: Pierre Simon Joseph Berini, Ottawa (CA); Guy Philippe Gagnon, Moncton (CA); Stéphanie Marie-Julie Jetté, Kanata (CA)

(73) Assignee: Spectalis Corp., Ottawa (CA)

( * ) Notice: Subject to any disclaimer, the term of this patent is extended or adjusted under 35 U.S.C. 154(b) by 16 days.

(21) Appl. No.: 10/956,129

(22) Filed: Oct. 4, 2004

(65) Prior Publication Data

US 2005/0058425 A1 Mar. 17, 2005

Related U.S. Application Data

(63) Continuation-in-part of application No. 10/617,863, filed on Jul. 14, 2003, now Pat. No. 6,801,691, which is a continuation-in-part of application No. 09/742,422, filed on Dec. 22, 2000, now Pat. No. 6,614,960, which is a continuation-in-part of application No. 09/629,816, filed on Jul. 31, 2000, now Pat. No. 6,442,321, application No. 10/956,129, which is a continuation-in-part of application No. 10/739,344, filed on Dec. 19, 2003.

(60) Provisional application No. 60/450,717, filed on Dec. 20, 2002, provisional application No. 60/171,606, filed on Dec. 23, 1999.

(30) Foreign Application Priority Data

Jul. 31, 2000 (CA) .................................. 2314723
Sep. 20, 2000 (CA) .................................. 2319949

(51) Int. Cl.
*G02B 6/00* (2006.01)
(52) U.S. Cl. .................................... 385/147

(58) Field of Classification Search ............ 385/14–31, 385/39–43; 372/6, 102; 250/227.1; 357/15, 357/30; 359/173
See application file for complete search history.

(56) References Cited

U.S. PATENT DOCUMENTS 3,631,501 A * 12/1971 Buscher ..................... 343/754
4,009,933 A    3/1977 Firester (Continued)

FOREIGN PATENT DOCUMENTS

DE          4240707 C1    2/1994

(Continued)

OTHER PUBLICATIONS

Q. Lai et al"Low-Power Compact 2×2 Thermooptic Silica-on-Silicon Waveguide Switch with Fast Response", IEEE Photonics Technology Letters, vol. 10, No. 5, May 1998.

(Continued)

*Primary Examiner*—Akm Enayet Ullah
(74) *Attorney, Agent, or Firm*—Thomas Adams

(57) ABSTRACT

A waveguide structure comprises a thin strip of material having a relatively high free charge carrier density surrounded by material having a relatively low free charge carrier density. The width and thickness of the strip are dimensioned such that optical radiation having a wavelength in a predetermined range couples to the strip and propagates along its length as a plasmon-polariton wave. The device includes a waveguide heater for passing a current through the strip to heat it and the surrounding material, so as to vary propagation of the optical radiation, or means for monitoring propagation of the optical radiation to determine a change in temperature of the strip. Some embodiments provide both heating of the strip and monitoring of its temperature.

7 Claims, 13 Drawing Sheets

U.S. PATENT DOCUMENTS

| | | | |
|---|---|---|---|
| 4,249,796 A | 2/1981 | Sincerbox et al. | |
| 4,384,760 A | 5/1983 | Alferness | |
| 4,390,236 A | 6/1983 | Alferness | |
| 4,432,614 A | 2/1984 | McNeill et al. | |
| 4,451,123 A | 5/1984 | McNeill et al. | |
| 4,479,224 A | 10/1984 | Rediker | |
| 4,533,207 A | 8/1985 | Alferness | |
| 4,583,818 A | 4/1986 | Chen et al. | |
| 4,776,656 A | 10/1988 | Sanford et al. | |
| 4,806,885 A | 2/1989 | Morimoto | |
| 4,857,973 A * | 8/1989 | Yang et al. | 257/73 |
| 4,896,325 A | 1/1990 | Coldren | |
| 4,915,482 A | 4/1990 | Collins et al. | |
| 4,948,225 A | 8/1990 | Rider et al. | |
| 4,971,426 A | 11/1990 | Schildkraut et al. | |
| 5,067,788 A | 11/1991 | Jannson et al. | |
| 5,075,796 A | 12/1991 | Schildkraut et al. | |
| 5,155,617 A | 10/1992 | Solgaard et al. | |
| 5,157,541 A | 10/1992 | Schildkraut et al. | |
| 5,173,956 A | 12/1992 | Hayes | |
| 5,218,610 A | 6/1993 | Dixon | |
| 5,347,395 A | 9/1994 | Lautenschlager et al. | |
| 5,418,868 A | 5/1995 | Cohen et al. | |
| 5,485,277 A | 1/1996 | Foster | |
| 5,499,256 A | 3/1996 | Bischel et al. | |
| 5,513,196 A | 4/1996 | Bischel et al. | |
| 5,559,816 A | 9/1996 | Basting et al. | |
| 5,583,643 A | 12/1996 | Gass et al. | |
| 5,615,289 A | 3/1997 | Duck et al. | |
| 5,625,729 A | 4/1997 | Brown | |
| 5,644,584 A | 7/1997 | Nam et al. | |
| 5,729,641 A | 3/1998 | Chandonnet et al. | |
| 5,734,667 A | 3/1998 | Esman et al. | |
| 6,021,141 A | 2/2000 | Nam et al. | |
| 6,034,809 A | 3/2000 | Anemogiannis | |
| 6,064,685 A | 5/2000 | Bissessur et al. | |
| 6,072,926 A | 6/2000 | Cole et al. | |
| 6,163,633 A | 12/2000 | Ueda | |
| 6,181,728 B1 | 1/2001 | Cordingley et al. | |
| 6,205,159 B1 | 3/2001 | Sesko et al. | |
| 6,229,947 B1 | 5/2001 | Vawter et al. | |
| 6,236,774 B1 | 5/2001 | Lackritz et al. | |
| 6,243,407 B1 | 6/2001 | Mooradian | |
| 6,377,716 B1 | 4/2002 | Veldhuis et al. | |
| 6,381,259 B1 | 4/2002 | Cordingley et al. | |
| 6,434,318 B1 | 8/2002 | Bischel et al. | |
| 6,442,231 B1 | 8/2002 | O'Hara | |
| 6,442,321 B1 | 8/2002 | Berini | |
| 6,504,651 B1 | 1/2003 | Takatori | |
| 6,507,681 B1 | 1/2003 | Kowalczyk et al. | |
| 6,614,960 B1 | 9/2003 | Berini | |
| 2002/0015433 A1 | 2/2002 | Zimmermann | |
| 2002/0018636 A1 | 2/2002 | Bischel et al. | |
| 2002/0037129 A1 | 3/2002 | Brinkman et al. | |
| 2002/0176687 A1 | 11/2002 | Diemeer et al. | |
| 2003/0059147 A1 | 3/2003 | Berini | |
| 2003/0223668 A1 | 12/2003 | Breukelaar et al. | |

FOREIGN PATENT DOCUMENTS

| | | |
|---|---|---|
| EP | 0810454 A1 | 12/1997 |
| EP | 0 324 611 | 7/1999 |
| EP | 1133035 A2 | 9/2001 |
| WO | WO 00/16140 | 3/2000 |
| WO | WO 02/08810 | 1/2002 |
| WO | WO 02/10815 | 2/2002 |
| WO | WO 02/10815 A2 | 2/2002 |
| WO | WO 2004/023177 | 3/2004 |

OTHER PUBLICATIONS

R. Kasahara et al, "Low-Power Consumption Silica-Based 2×2 Thermooptic Switch Using Trenched Silicon Substrate", IEEE Photonics Technology Letters, vol. 11, No. 9, Sep.

Y. Hida et al., "Polymer Waveguide Thermooptic Switch with Low Electric Power Consumption at 1.3um", IEEE Photonics Technology Letters, vol. 5, No. 7, Jul. 1993.

B.A. Moller et al, "Silica-Waveguide Thermooptic Phase Shifter with Low Power Consumption and Low Lateral Heat diffusion", IEEE Photonics Technology Letters, vol. 5, No. 12.

A. Sugita et al, "Bridge-Suspended Silica-Waveguide Thermo-Optic Phase Shifter and Its Application to Mach-Zehnder Type Optical Switch", IEICE, vol. E 73, No. 1, Jan. 1990.

Sang-Shin Lee et al, "Variable Optical Attenuator Based on a Cutoff Modulator with Tapered Waveguides in Polymers", Journal of Lightwave Technology, vol. 17, No. 12, Dec.

M. Paniccia, P. Flinn, R. Reifenberger, "Scanning probe microscopy studies of electromigration in electroplated Au wires", J.Appl.Phys., 73(12), Jun. 15, 1993.

Gorachand Ghosh, "Temperature Dispersion of Refractive Indexes in Some Silicate Fiber Glasses", IEEE Photonics Technology Letters, vol. 6, No. 3, Mar. 1994.

Gorachand Ghosh, "Temperature-Dependent Sellmeier Coefficients and Chromatic Dispersions for Some Optical Fiber Glasses", Journal of Lightwave Technology, vol. 12, No. 8, Aug.

Gorachand Ghosh, "Sellmeier coefficients and dispersion of thermo-optic coefficients for some optical glasses", Applied optics, vol. 36, No. 7, Mar. 1, 1997.

Jaeger et al "Voltage-Induced Optical Waveguide Modulator in Lithium Niobate", IEEE Journal of Quantum Electronics, vol. 25. No. 4, 1989, pp 720-728.

Ashley et al "Improved Mode Extinction Modulator Using a Ti-Indiffused LiNbO3 Channel Waveguide", Applied Physics Letters, vol. 45, No. 8 1984, pp. 840-842.

Yariv and Yeh "Optical Waves in Crystals", John Wiley & Sons, New York 1984.

Bozhevolnyi "Waveguiding in Surface Plasmon Polariton Band Gap Structures" Physical Review Letters vol. 86,No. 14, Apr. 2, 2001.

Fano, U., J. Opt. Soc. Am., vol. 31, pp. 213-222, 1941 The Theory of Anomalous Diffraction Gratings and of Quasi-Stationary Waves on Metallic Surfaces (Sommerfeld's Waves).

Zenneck, J., Ann. Phys., vol. 23, pp. 846-866, 1907.

Yang, F., Sambles, J. R., Bradberry, G. W., "Long-range surface modes supported by thin films", Physical Review B., pp. 5855-5872, vol. 44 (No. 11), Sep. 15, 1991.

Ashcroft, N. W., Mermin, N. D., "Solid State Physics,", Harcourt, Inc., Orlando, FL, 1976, Chapter 1.

"Surface Plasmon-Polariton Study of the Optical Dielectric Function of Silver", Nash, D.J., Sambles, J.R., Journal of Modern Optics, vol. 43, No. 1 (1996), pp. 81-91.

"Electromagnetic Surface Modes". Boardman, A.D., Wiley Interscience, 1982.

"Surface Plasmons in Thin Films", Economou, E.N., Physical Review, vol. 182, No. 2 (Jun. 1969), pp. 539-554.

"Surface-Polariton-Like Waves Guided by Thin, Lossy Metal Films", Burke, J.J., Stegeman, G.I. Tamir, T., Physical Review B, vol. 33, No. 8 (Apr. 1986), pp. 5186-5201.

"Long-Range Surface Plasmon-Polaritons in Asymmetric Layer Structures", Wendler, L., Haupt, R., Journal of Applied Physics, vol. 59, No. 9 (May 1986), pp. 3289-3291.

"Guided Optical Waves in Planar Heterostructures with Negative Dielectric Constant" Prade, B., Vinet, J.Y., Mysyrowicz, A., Physical Review B, vol. 44, No. 24 (Dec. 1991), pp. 13556-13572.

"Negative Group Velocities in Metal-Film Optical Waveguides", Tournois, P., Laude, V., Optics Communications, Apr. 1997, pp. 41-45.

"Surface Plasmon Polaritons in Thin Metal Films and Their Role in Fiber Optic Polarizing Devices", Johnstone, W., Stewart, G., Hart, T., Culshaw B., Journal of Lightwave Technology, vol. 8, No. 4 (Apr. 1990), pp. 538-544.

"Characterization of Metal-Clade TE/TM Mode Splitters Using the Finite Element Method", Rajarajan, M., Themistos, C., Rahman, B.M.A., Grattan, K.T.V., Journal of Lightwave Technology, vol. 15, No. 12 (Dec. 1997), pp. 2264-2269.

"Plasmon-Polariton Modes Guided by a Metal Film of Finite Width", Berini, P., Optics Letters, vol. 24, No. 15 (Aug. 1999), pp. 1011-1013.

"The Method of Lines",Numerical Techniques for Microwave and Millimeter-Wave Passive Structures, Pregla, R., Pascher, W., Wiley Interscience, 1989, T. Itoh, Editor.

"Modeling Lossy Anisotropic Dielectric Waveguides With The Method of Lines", Berini, P., Wu, K., IEEE Transactions on Microwave Theory and Techniques, vol. MYY-44, No. 5 (May 1996), pp. 749-759.

"Normal Mode Analysis and Characterization of an InGaAs/ GaAs MQW Field-Induced Optical Waveguide Including Electrode Effects", Berini, P., Stohr, A., Wu, K. Jager, D., Journal of Lightwave Technology, vol. 14, No. 10 (Oct. 1996), pp. 2422-2435.

"The Use of Extrapolation Techniques with Electrical Network Analogue Solutions", Culver, R., British Journal of Applied Physics, vol. 3 (Dec. 1952) pp. 376-378.

"Computation Methods for Electromagnetics and Microwaves", Boonton, R.C., Wiley Interscience, 1992.

"Excitation of Surface Polaritons by End-Fire Coupling", Stegeman, G.I., Wallis, R.F., Maradudin, A.A., Optics Letters, vol. 8, No. 7 (Jul. 1983), pp. 386-388.

"Plasmon-Polariton Waves Guided by Thin Lossy Metal Films of Finite Width: Bound Modes of Symmetric Structures", Berini, P., Physical Review B, vol. 61, No. 15, (2000), pp 10484-10503.

"Experimental Observation of Plasmon-Polariton Waves Supported by a Thin Metal Film of Finite Width", Charbonneau, R., Berini, P., Berolo, E., Lisicka-Skrzek, E., Optics Letters, vol. 25, No. 11, pp. 844-846, Jun. 2000.

"Measurement of The Electrically Induced Refractive Index Change in Silicon for Wavelength =1.3 um using a Schottky Diode", Evans, A.F., Hall, D.G., Applied Physics Letters, vol. 56, No. 3, pp. 212-214, Jan., 1990.

"Integrated Optics Waveguide Modulator Based on Surface Plasmons", Jung, C., Yee, S., Kuhn, K., Journal of Lightwave Technology, vol. 12, No. 10, pp. 1802-1806, Oct. 1994.

"High Frequency Attenuated Total Internal Reflection Light Modulator", Solgaard, O., Ho, F., Thackara, J.I., Bloom, D.M., Applied Physics Letters, vol. 61, No. 21, pp. 2500-2502, Nov., 1992.

"Long-range surface plasmon electro-optic modulator", Schildkraut, J.S., Applied Optics, vol. 27, No. 21, pp. 4587-4590, Nov., 1988.

"Novel Integrated Optic Intensity Modulator Based on Mode Coupling", Driessen, A., Klein Koerkamp, H.M.M., Popma, Th.J.A., Fibre and Integrated optics, vol. 13, pp. 445-461, 1994.

"A Cost 240 Benchmark Test for Beam Propagation Methods Applied to a Electrooptical Modulator Based on Surface Plasmons", Hoekstra, H.J.W.M.et al, Journal of Lightwave Technology, vol. 16, No. 10, pp. 1921-1926, Oct. 1998.

"The Proximity Effect of Conductors in Optical Waveguide Devices. Coupling to Plasmon-Polariton Modes", Berini, P., SPIE SD-25 Millimeter-Wave Materials Devices and Components, in print, Jul. 2000.

"The Almost-Magical wordl of photonic Crystals" J.D. Joannopoulos, Brazilian Jornal of Physics, vol. 26, No. 1, Mar. 1996 pp 58-67.

"Plasmon-Polariton Modes Guided by a Metal Film of Finite Width Bounded by Different Dielectrics", Berini, P., Optics Express, vol. 7, No. 10, pp. 329-335.

"Plasmon-Polariton waves guided by thin lossy metal films of finite width: Bound Modes of Asymmetric Structures", Bereini, P., Physical Review B, in Press. Not yet published.

"A Complete Description of the Dispersion Relation for Thin Metal Film Plasmon-Polaritons", Burton, F.A., Cassidy, S.A., Journal of Lightwave Technology, vol. 8, No. 12 (Dec. 1990), pp. 1843-1849.

"Optical Properties of Metals", Georg Hass, U.S. Army Engineer Research and Development Laboratories, Colorado State University, Optics.

Glytsis E N et al "High-Spatial-Frequency Binary and Multivelvel Stairstep Gratings: Polarization-Selective Mirrors and Broadband Antifeflection Surfaces" Applies Optics, Optical Society of America, washingtom US vol. 31 no. 22.

Liu J. et al" Infrared Quarter-Wave Reflector Retarders Designed with High-Spatial-Frequency Dielectric Surface-Relief Gratings on Goldsubstrate at Oblique Incidence" Applied Opticsa, Optical Society of America, Washington US vol. 35, No. 28.

Charbonneau, R. Berini, P. et al, "Long-Range Plasmon-Polariton Wave Propagation in Thin Metal Films of Finite-Width Excited Using an End-Fire Technique", Proceedings of SPIE, vol. 4087, p. 534, 2000.

Low W H et al "Sampled Fiber Grating Based-Dispersion Slope Compensator" IEEE Photonics Technology Letters, IEEE Inc. New York, US, vol 11, No. 10, Oct. 1999.

Tredicucci, A et al Single-mode Surface-plasmon Laser:, Applied Physics Lettters, vol 76, No. 16,p 2164, 2000.

Yeh, Pochi "Optical Waves in Layered Media", Wiley, 1988.

Vinogtadox, A V "X-ray and Far UV Multilayer Mirrors: Principles and Possibilities", Applied Optics, vol 16, No. 1, p 89, 1977.

Berini, P. "Plasmon-polariton waves guided by thin lossy metal films of finite width: Bound modes of symmetric structures". Physical Review B, vol. 61, No. 15, p. 10484, 2000.

Charbonneau, R., Berini, P., et al. "Long-Range Plasmon-Polariton Wave Propagation in Thin Metal Films of Finite-Width Excited Using an End-Fire Technique". Proceedings of S.

Berini, P. "Plasmon-polariton modes guided by a metal film of finite width bounded by different dielectrics", Optics Express, vol. 7, No. 10, p. 329, 2000.

Berini, P. "Plasmon-polariton modes guided by a metal film of finite width". Optics Letters, vol. 24, o.15, p. 1011, 1999.

Charbonneau, R., Berini, P. "Experimental observation of plasmon-polariton waves supported by a thin metal film of finite width", Optics Letters, vol. 25, No. 11, p. 844, 2000.

Berini, P. "Plasmon-Polariton Waves Guided by Thin Lossy Metal Films of Finite Width: Bound Modes of Asymmetric Structures", Physical Review B, vol. 63, 125417, 2001.

Tredicucci, A. et al. "Single-mode surface-plasmons laser", Applied Physics Letters, vol. 76, No. 16, p. 2164, 2000.

Yeh, Pochi. "Optical Waves in Layered Media", Wiley, 1988.

Benson, H. et al. "Physique I Mécanique", Editions du Renouveau Pedagogique Inc., 1993.

* cited by examiner

THERMO-OPTIC PLASMON-POLARITON DEVICES

CROSS-REFERENCE TO RELATED APPLICATIONS

This application is a Continuation-in-Part of U.S. patent application Ser. No. 10/617,863 filed Jul. 14, 2003 now U.S. Pat. No. 6,801,691 which is a Continuation-in-Part of U.S. patent application Ser. No. 09/742,422 filed Dec. 22, 2000 now U.S. Pat. No. 6,614,960 issued Sep. 2, 2003 which itself was a Continuation-in-Part of U.S. patent application Ser. No. 09/629,816 filed Jul. 31, 2000, now U.S. Pat. No. 6,442,321 issued Aug. 27, 2002, and which claimed priority from U.S. Provisional patent application No. 60/171,606 filed Dec. 23, 1999, Canadian patent application No. 2,314,723 filed Jul. 31, 2000 and Canadian patent application No. 2,319,949 filed Sep. 20, 2000. This application is also a Continuation-in-Part of U.S. patent application Ser. No. 10/739,334 filed Dec. 19, 2003 claiming priority from U.S. Provisional patent application No. 60/450,717 filed Dec. 20, 2002. The contents of all of these applications and patents are incorporated herein by reference.

BACKGROUND OF THE INVENTION

1. Technical Field

The invention relates to thermo-optic waveguide structures in which an optical characteristic of the structure changes in dependence upon a change in temperature, and to devices employing such a waveguide structure. The invention also relates to such waveguide structures having means for monitoring variations in temperature of part of the waveguide structure.

2. Background Art

This specification refers to several published articles, For convenience, the articles are cited in full in a numbered list at the end of the description and cited by number in the specification itself. The contents of these articles are incorporated herein by reference and the reader is directed to them for reference.

In the context of this patent specification, the term "optical radiation" embraces electromagnetic waves having wavelengths in the infrared, visible and ultraviolet ranges.

The terms "finite" and "infinite" as used herein are used by persons skilled in this art to distinguish between waveguides having "finite" widths in which the actual width is significant to the performance of the waveguide and the physics governing its operation and so-called "infinite" waveguides where the width is so great that it has no significant effect upon the performance and physics or operation.

It is well known that refractive index changes can be used to manipulate the propagation of light. Depending on the material, refractive index changes can be induced thermally, electro-optically, or otherwise. The thermo-optic (TO) effect is present in a material when a change in its temperature causes a change in its refractive index. In known optical devices, the usual configuration in which the TO effect is exploited comprises a thin film heater deposited on top of a TO material which is located in the propagation path of the light. The propagation of light can then be affected by injecting a current through the thin film heater which will generate heat via ohmic losses. The TO effect has been used in the prior art for many applications, such as to tune Bragg gratings, switch, multiplex, demultiplex, attenuate or modulate an optical signal It is known to construct thermally activated variable optical attenuators (VOA's) from a straight waveguide section where the propagating mode is thermally induced into cut-off, or from a Mach-Zehnder Interferometer (MZI) structure where the insertion phase of one arm is thermally changed to create destructive interference. It is also known that thermally-activated couplers, MZI's and Gragg gratings can be assembled to enable switching and tunable filtering functions.

Much effort has been devoted to improving such devices. In an article entitled "*Variable Optical Attenuator Based upon a Cut Off Modulator with Tapered Waveguides in Polymers*", *Journal of Lightwave Technology* Vol. 17, No. 12, December 1999, pp. 2556–2561, Sang-Shin Lee et al. revealed that, in a cut-off modulator, heating of the dielectric waveguide via a thin film heater reduced the lateral confinement of the structure. The dynamic range was more than 20 dB with an electrical power consumption of 160 mW. The optical response time was faster than 1.5 ms. In U.S. Pat. No. 6,507,681, Bischel et al. disclosed a similar structure and claimed that, by heating sufficiently, they could create an anti-waveguiding region which improved the extinction ratio of the device. In their U.S. patent application Ser. No. 2002/0018636, Bischel et al. disclosed a VOA in which a heater above a waveguide created an asymmetric refractive index profile along the vertical axis extending between the thermal source and the heat sink. The optical energy propagating along the core was transversely deflected in the region away from the thermal source. They claim that the device is able to achieve 30 dB attenuation with 15 mW of power consumption with rise and fall times of at least 270 μs and 1260 μs respectively.

Other examples of known VOA's based on the MZI structure include *IEEE Photonics Technology Letters*, vol. 5, No. 7, July 1993 pp. 782–784, "*Polymer Waveguide Thermooptic Switch with Low Electric Power Consumption at 1.3 μm*" by Yasuhiro Hida et al. The authors claim that the device achieves a π-phase shift with 4.8 mW of power consumption and rise and fall times of 9 ms.

U.S. Pat. No. 5,173,956 discloses TO switching of an optical waveguide by means of a Schottky diode created on top of a ridge waveguide fabricated from GaAs. A ground plane is deposited under the device. The Schottky diode is forward biased and a current flows between the electrode and the ground plane causing heating of the semiconductor. Heat is localized to the Schottky diode region. It is claimed that switching times are 0.3 microsecond while power consumption varies between 100 mW and 800 mW depending on the desired mode of operation of the device. Internal heating is caused by a current flowing between the electrode and the ground plane, with heating localized within the region of current flow. However, only a fraction of the heated region overlaps well with the waveguide to influence the propagation of light, resulting in less than optimal energy efficiency for the device.

Generally, despite such efforts to improve response times for a given power, these known devices are not entirely satisfactory, primarily because the heat source is located a distance away from the optical waveguide core. Consequently, heat must diffuse from the source into the waveguide core in order to affect the light confined therein, which is a time consuming process. Furthermore, heat diffuses away from the source in many directions: while some of the heat is directed towards the waveguide, a significant amount is lost and unused.

It is known to add trenches each side of the waveguide to limit lateral heat diffusion, but this is at the expense of increased fabrication complexity and slower switching times. Also, some of the prior art devices are sensitive to the ambient temperature and require temperature control. Finally, device size and manufacturing costs are other problems with some of the prior art devices.

Thus, a disadvantage of these known devices generally is that they suffer from one or more of the following limitations: high power consumption, low energy efficiency, complex temperature control requirements, large device size, complex fabrication requirements, inaccurate thermal sensing, and poor optical performance.

SUMMARY OF THE INVENTION

The present invention seeks to provide a device that overcomes or at least mitigates the disadvantages of such prior art devices; or at least provides an alternative.

According to one aspect of the present invention, there is provided a waveguide structure formed by a thin strip of material having a relatively high free charge carrier density surrounded by material having a relatively low free charge carrier density, the strip having finite width and thickness with dimensions such that optical radiation having a wavelength in a predetermined range couples to the strip and propagates along the length of the strip as a plasmon-polariton wave, and heater means for causing heating of the strip to vary propagation of said optical radiation.

The heater means may comprise connector arms connected to opposite ends of the strip, the connector arms serving to pass current from a current source through the strip to cause heating thereof. The heat changes the refractive index of the surrounding material around the strip. The refractive index change is roughly inversely proportional to the distance away from the strip.

Where the surrounding material (substrate and superstrate) has a positive thermo-optic coefficient, such as glass, the change in the refractive index due to heating is positive and has a maximum value close to the strip, decreasing as the distance from the strip increases, leading to a thermally-activated phase shifting element which can be incorporated into an MZI, a coupler, or other device wherein variable phase-shifting is desired.

For the case of a surrounding (substrate and superstrate) material having a negative thermo-optic coefficient, such as a polymer, the change in the refractive index due to heating is negative and has a maximum absolute value close to the strip that decreases as the distance from the strip increases, leading to mode cut-off and anti-waveguiding at sufficiently high temperatures. When the strip is heated enough, the mode supported by the waveguide is cut off and power radiates out of the waveguide, leading to a waveguide attenuator or VOA. In this case, radiation occurs in every direction as opposed to only one dimension as disclosed in the article entitled "Variable Optical Attenuator Based upon a Cut Off Modulator with Tapered Waveguides in Polymers", *Journal of Lightwave technology* Vol. 17, No. 12, December 1999 by Sang-Shin Lee et al. and U.S. Patent publication No. 2002/0018636. By heating the waveguide even more, the extinction ratio can be increased.

Where the surrounding (substrate and superstrate) material has a negative thermo-optic coefficient, as discussed above, providing the heating is not sufficient to drive the mode into cut off, a thermally activated phase shifting element can be realized.

In another preferred embodiment, the device has a Mach-Zehnder (MZ) configuration, with two connector arms connected each to a respective branch of the MZ and a gap between the Y junction and the respective one of the connector arms in order to electrically isolate each branch.

Preferably, extinction of the light at the output of the MZ is achieved by heating only one branch of the MZ so that the refractive index of that branch is affected, thereby creating a phase difference between the light propagating in each branch of the MZ. Total extinction may be obtained by heating the strip until a desired phase difference is achieved. Care must be taken so that the MZ may achieve this at low operating electrical power; otherwise cut-off will occur as explained above.

In other embodiments, the substrate and superstrate are different, the strip extending along an interface therebetween. Far example, the substrate may be a silica with a superstrate of polymer. The increase of temperature caused by the heater means causes an asymmetry in the refractive index profile which causes cutoff of the mode supported by the waveguide.

In another embodiment, the substrate and superstrate are the same material but the thermal design is asymmetric, comprising for example a thermal conductor on one side and a thermal insulator on the other. In this case, the heating induces an asymmetry in the index distribution, eventually cutting off the mode.

Often in TO devices it is necessary or useful to determine the temperature of the waveguide. Generally, thermocouples or thermistors are used as monitors for measuring the temperature of thermo-optic devices. An accurate temperature measurement is achieved when the monitor is placed as close as possible to the object for which the temperature is desired. In the case of TO devices, the temperature desired is that of the core of the waveguide. The monitor is typically large compared with the device to be measured, so proceeding with the measurement by inserting, say, a thermocouple into the core of a dielectric waveguide would not only perturb heat transfer but also the wave supported by the optical waveguide. A conventional approach to solving this problem consists in placing the monitor in close proximity to the waveguide but not so close that it interacts with the thermal and optical performance of the device. This compromises the accuracy of the measurement.

Embodiments of the present invention address this problem by measuring the resistance of the strip and deducing therefrom its resistivity. Pre-calibration of the resistivity with respect to temperature allows the resistivity to be used to determine the temperature of the strip.

A portion of the strip that is not being heated by means other than the light propagating along it, may be used to measure the intensity of the light propagating along the strip.

According to a second aspect of the invention, there is provided a waveguide structure formed by a thin strip of material having a relatively high free charge carrier density surrounded by material having a relatively low free charge carrier density, the strip having finite width and thickness with dimensions such that optical radiation having a wavelength in a predetermined range couples to the strip and propagates along the length of the strip as a plasmon-polariton wave, and means for monitoring the temperature of the strip.

The foregoing and other objects, features, aspects and advantages of the present invention will become more apparent from the following detailed description, in conjunction with the accompanying drawings, of a preferred embodiments of the invention.

DESCRIPTION OF THE PREFERRED EMBODIMENTS

In the following description, a straight waveguide VOA will be referred as a SWGVOA while a VOA based on a MZ configuration will be referred as a MZVOA. Also, the terms "plasmon-polariton wave" and "optical mode" used herein refer to the main long-ranging plasmon-polariton wave supported by the waveguide and denoted $ss_n^0$ in the aforementioned U.S. Pat. No. 6,442,321. The terms "waveguide heater" and "waveguide monitor" will be used herein when referring to the strip (which with the surrounding material forms the optical waveguide) being used as a heating element and a temperature monitor, respectively.

Figure 1A:
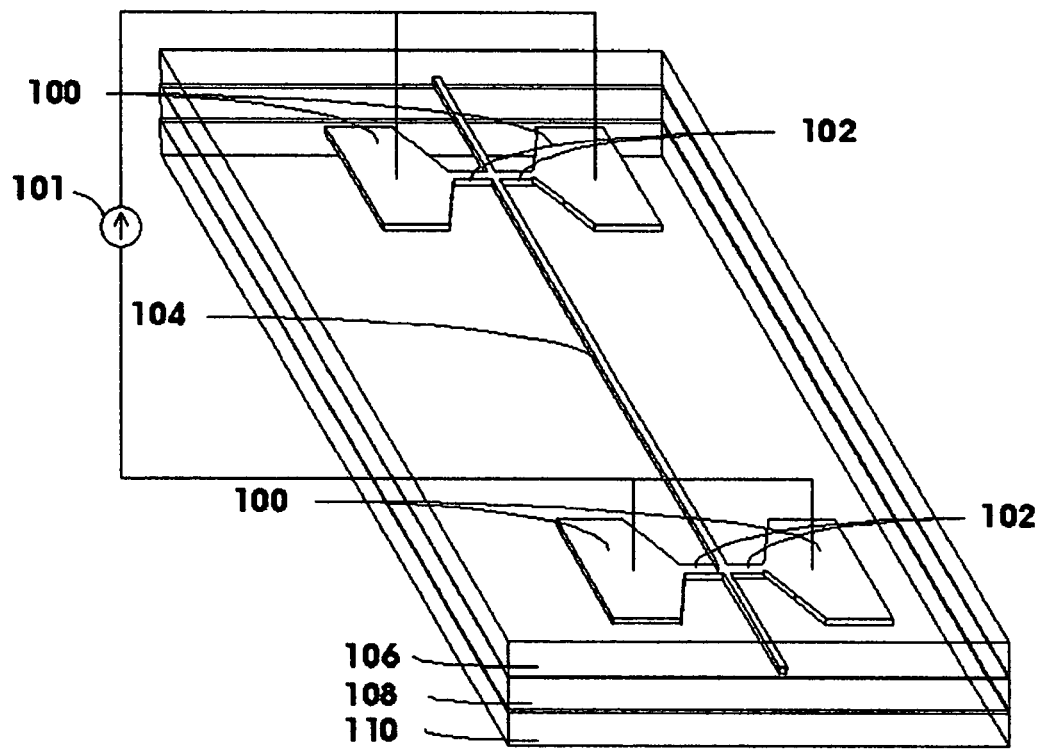
FIG. 1A shows a three-dimensional view of waveguide structure that is a first embodiment of the invention.
Figure 1B:
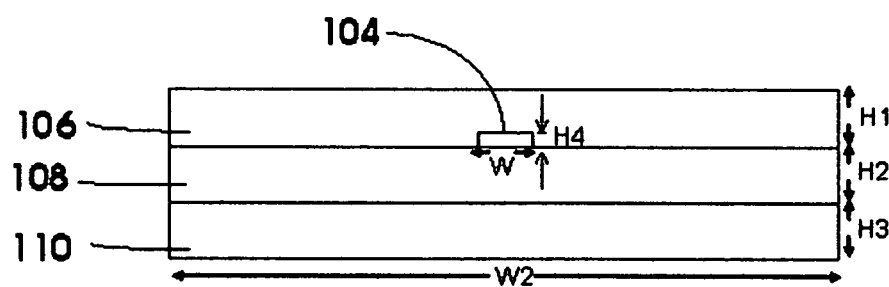
FIG. 1B shows a cross-sectional view of the waveguide structure and applies also to each independent branch of an MZVOA (see FIG. 2A)

FIGS. 1A and 1B and show the basic structure of a SWGVOA. The SWGVOA comprises a core 104 of predetermined length. The desired properties of the core of the waveguide 104 include a negative real permittivity, a small imaginary permittivity and high thermal diffusivity, in order for the core 104 to be able to produce heating and still maintain low optical loss, the core material 104 must have a very low but non zero electrical resistivity. Given the small cross-section of the waveguide and heating requirements of the VOA, the core 104 must have a high threshold electromigration current density. The threshold electromigration current density is defined, herein, as the current density required to cause a macroscopic degradation of the metal core of the waveguide due to the massive electron flow that displaces its atoms. Materials that satisfy these requirements include the noble metals (Au, Ag, Cu) and Al.

Semiconductors could also achieve these requirements, but it is believed that the best choice are the ones mentioned above. Hence, in the following description of the preferred embodiments, the core 104 will be assumed to be a metal and, more specifically, gold. Gold is assumed to have the following properties: a refractive index of 0.55–11.5$i$, an electrical conductivity of 4.1*$10^7$ ($\Omega$m)$^{-1}$, a thermal conductivity of 298 W/(m*K) and a threshold electromigration current density of 50*$10^9$ A/m$^2$. U.S. Pat. No. 6,442,321 or WO 2001/048521 suggests that the cross-section of the core 104 of the waveguide should be about 20 nm thick by 4 to 8 microns wide, when used with a substrate and superstrate of refractive index near 1.4, in order to obtain good optical losses, and for wavelength near 1310 nm and 1550 nm. Herein, 8 microns was selected for the width of the waveguide.

The core 104 of the waveguide is embedded between the substrate 108 and superstrate 106, also called the lower and upper claddings, respectively. The substrate 108 and superstrate 106 are made of a material having a large TO coefficient. It is also desirable that they possess a low thermal conductivity for low power consumption, no electrical conductivity (or very little), high thermal diffusivity, a positive real permittivity and low optical loss. Materials that satisfy these requirements relatively well are known to include polymers. The thickness of the substrate 108 and superstrate 106 were both set to 15 microns, herein, which is thick enough to not perturb significantly the mode supported by the waveguide given its confinement. The thermal conductivity was set to 0.11 W/(m*K). The whole device sits onto a heat sink 110, which has a very high thermal conductivity. Herein, the heat sink 110 was selected to be Si with refractive index of 3.475, thermal conductivity of 145 W/(m*K). The Si layer was set to be 10 microns thick to reduce thermal simulation time but infinitely thick for the purpose of optical simulations. It is assumed that the heat sink 110 sits onto a metal casing encapsulating the device which is at room temperature. It is also assumed that the device within the casing is surrounded by air and that convection is negligible. Hence, there is a thick layer of air on top of the superstrate 106.

In order to inject current into the waveguide 104, connector arms 102 are provided in the same plane as, but perpendicular to, the waveguide 104. Relatively large metal pads 100 deposited on top of the connector arms 102 facilitate electrical connections to the connector arms 102. The actual dimensions of the pads 100 are not critical, but they must be able to sustain electrical contacting and be placed far enough away from the waveguide 104 that they do not perturb the optical modes. Herein, the closest edges of the metal pads 100 to the waveguide 104 are located at a minimum distance of 20 microns. The length of the connector arms 102 is not critical and depends on the distance separating the pads 100 from the waveguide 104. The cross-section of the connector arms 102 must be large enough to sustain at least the same amount of current as the waveguide 104, without causing substantive heating, but small enough not to become optically invasive. Herein the cross-section of each of the connector arms 102 is set equal to that of the waveguide strip 104.

Two pairs of connecting arms 102 are provided, one pair at each end of the waveguide 104, in order to balance the structure. Current is injected via source 101 into a first pair of connecting arms 102 and the sum of these currents passes through the waveguide 104. Finally, the current comes out of the second pair of connecting arms 102 at the other end of the waveguide 104.

Figure 2A:
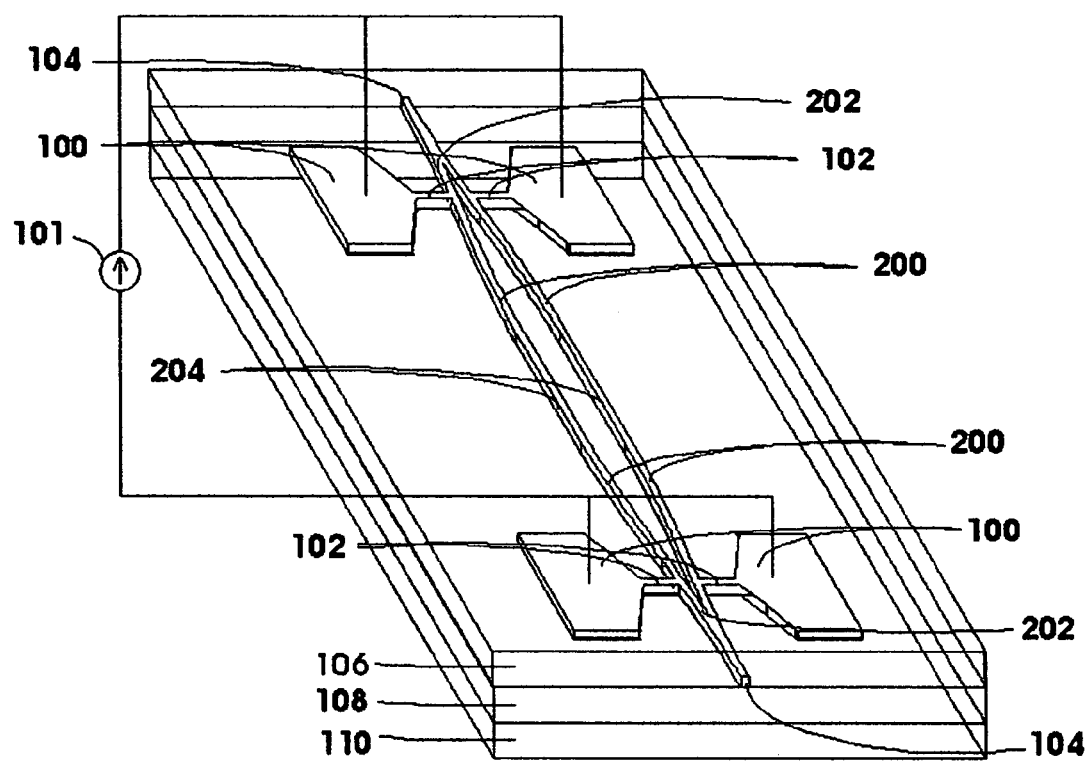
FIG. 2A shows a 3 dimensional view of the MZVOA configuration.
Figure 2B:
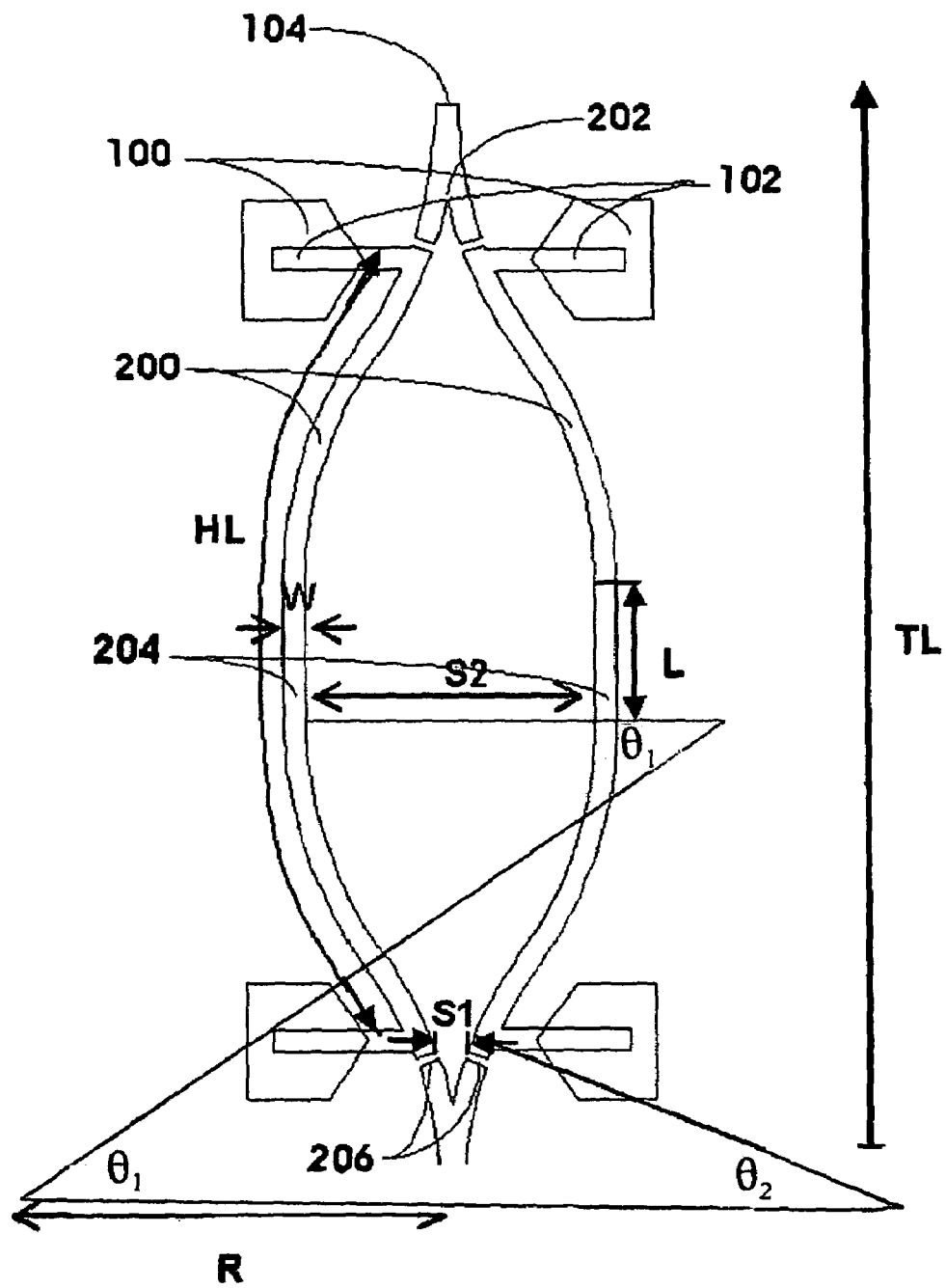
FIG. 2B shows the top view of the same MZ, but it also includes details of its geometry and gaps that were not shown in FIG. 2A.

In a second embodiment, shown in FIGS. 2A and 2B, a MZVOA is formed by a single waveguide 104 split into two waveguides 204 via a Y-junction 202 and curved waveguides 200. As shown in FIG. 2A, connecting arms 102 are used to insert current into either or both branches of the MZVOA. In FIG. 2B, gaps 206 filled with superstrate material 106 are inserted between the Y-junctions 202 and the connecting arms 102. This enables each branch 204 to be electrically isolated and independently controlled. The gap length 206 is selected such that it will minimize perturbations of the optical mode propagating in the waveguide 104. Herein, the gap length 206 was set equal to about 1 μm. Connecting arms are preferably connected to both branches of the MZI in order to keep the structure balanced, through only one of the branches need be active.

In the case where the applied current varies in time (A.C.) then the gap capacitance should be kept small enough to prevent significant coupling with Y-junctions. This can be achieved by lengthening the gap. A gap of a few microns does not impact too deleteriously the propagation of the optical mode.

The MZ geometry was selected such that a tradeoff was made between thermal cross-talk, which depends on branch separation S2, and the insertion loss of the device, which depends on the device's total optical path length. The radius of curvature, R represented in FIG. 2B, of the waveguide 200 was set a small as possible without introducing significant bending loss. The variables describing the geometry of the MZ are shown in FIG. 2B. Herein S1, S2, W, R were set to 100, 200, 8 and 12500 microns respectively. $\theta_1$, $\theta_2$, L and TL are determined by in the equations:

$$\theta_1 = a\cos\left(1 - \frac{S2+W}{4R}\right) \quad (1)$$

$$\theta_2 = a\cos\left(1 - \frac{S2-S1}{2\left(R-\frac{W}{2}\right)}\right) \quad (2)$$

$$L = HL - 2\theta_2 R \quad (3)$$

$$TL = 4\theta_1 R + L \quad (4)$$

Current is injected into one of the arms 204 of the MZ via the connecting arms 102 in order to heat the waveguide 204. As the waveguide 204 is heated, the refractive index near metal strip 204 of the MZ will change, affecting the characteristics of the plasmon polariton wave supported. A phase difference between the waves of the heated and unheated arms 204 occurs such that, when both waves recombine at the output combine of the MZ 202, destructive interference will occur. Maximum extinction will occur when there is a π-phase difference between the two arms 204 of the MZ.

Theory

As described in the previous section, the metal optical waveguide is heated through ohmic losses in order to influence the propagation of light. To determine the amount of heat generated by the waveguide and the temperature distribution within the device, thermal modelling was conducted. The thermal modelling was based on the steady state 2D thermal diffusion equation shown in equation (5) since for the purposes of thermal modelling, the device can be treated as infinitely long and uniform.

$$\frac{\partial}{\partial x}\left(k\frac{\partial T}{\partial x}\right) + \frac{\partial}{\partial y}\left(k\frac{\partial T}{\partial y}\right) + \frac{J^2}{\sigma} = 0 \quad (5)$$

where k, x, y, T, J and σ represent the thermal conductivity, the position coordinates (x,y) in the most-sectional plane of the waveguide with the origin located at the centre of the strip, the temperature in Kelvin, the current density and the electrical conductivity respectively, k, T, J and σ are dependent on the position (x,y). A thermal simulation of the waveguide structure of FIG. 1 was conducted, which is also applicable to the second embodiment. It was assumed that the interface between the superstrate and air is adiabatic since air has a very low thermal conductivity when convection is negligible. The heat sink, Si, was maintained at room temperature and it was assumed to be only 10 microns thick. Typically a Si wafer is 600 microns thick but no significant difference is obtained between the two cases. Hence, 10 microns was used to reduce simulation time. The sides of the device were also set to be adiabalic and the width of the device, W2, as shown in FIG. 1B was set as small as possible without having a significant impact on the results. This also reduces simulation time. Finally, because of the half symmetry of the device, only half of the domain was computed.

There are two limitations on the amount of heat that can be provided by the heat source. The injected current density should not come close to the threshold electromigration current density otherwise the waveguide will eventually be destroyed. For Au, the electromigration current density is about $50*10^9$ A/m$^3$. Secondly, polymers usually cannot withstand temperatures beyond 120° C. It is therefore important that these critical values are not surpassed. The third term on the left had side of equation (5) is the source of heat which is also given in equation (6), $$P_d = \frac{P}{V} = \frac{J^2}{\sigma}[W/m^3] \quad (6)$$

where $P_\omega$, V and P are the electrical power density dissipated, the volume and the total electrical power dissipated respectively. This equation shows that the amount of heat produced by the waveguide heater is limited by the threshold electromigration current density because the electrical conductivity is fixed in the value associated with the metal or semiconductor chosen.

Figure 3:
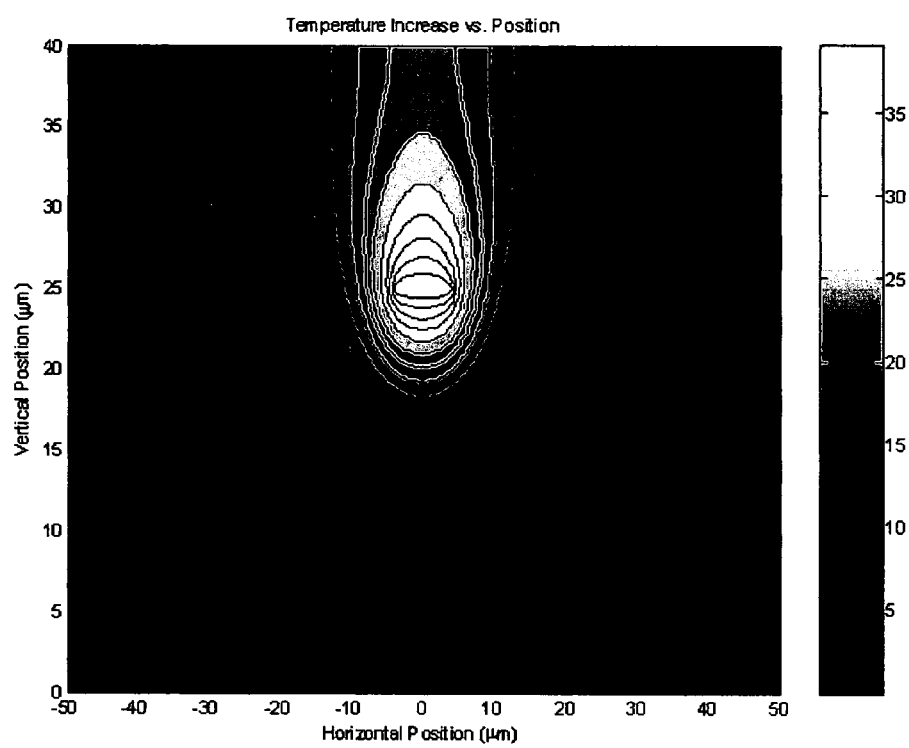
FIG. 3 shows the isotherms resulting from thermal simulations for the structure of FIG. 1, the grayscale colour bar showing the increase of temperature in °K due to heating the waveguide (the origin of the coordinate system being located at the intersection of the lower heat sink interface and vertical center of the waveguide heater; hence the waveguide is located at a horizontal and vertical position 0 and 25 microns respectively)

Thermal simulations were conducted using the parameters given above and isothermal contours displayed for various temperatures near the metal strip for the maximum current density of $50*10^9$ A/m$^2$ in FIG. 3. The temperature increase in the center of the core of the metal strip is 41.627° C. By comparing this thermal profile, to the mode profile supported by the waveguide as provided in U.S. Pat. No. 6,442,321 it can be seen that both profiles overlap very well. Both have their highest intensity near the center of the waveguide and their intensity vanishes as the distance from the waveguide increases.

Once the thermal profile is obtained around the metal strip, it is possible to determine the corresponding resulting refractive index profile using equation (7).

$$n_{T_1} = n_{To} + \frac{\partial n}{\partial T}\bigg|_{To} + (T_1 - To) \qquad (7)$$

where $n_{T_1}$, $$n_{To}, \frac{\partial n}{\partial T}\bigg|_{To}$$

represent the refractive index at temperature $T_1$ the refractive index at temperature $T_0$ and the TO coefficient at $T_0$ respectively. The TO coefficient is assumed constant, herein, since the range of temperature considered is relatively small. $T_0$ represent the ambient temperature. It follows from equation (7) that the refractive index profile around the waveguide heater looks the same as FIG. 3 except that the temperature is replaced by its corresponding refractive index.

To determine the impact of the refractive index change on the propagation of the mode supported by the waveguide, an optical simulator was used. Usually a 2D optical simulator would be used, but it is known that the 2D mode results for an 8 micron waveguide are very similar to that obtained for a metal slab. Known differences will be pointed out where necessary. Using this simplification, a much faster optical simulator is used to obtain results. Consequently, instead of using the two-dimensional thermal contours given in FIG. 3, a cut along the vertical center of the waveguide is used.

The optical simulator is based on solving Maxwell's equations for an n layer stratified media comprising a metal slab of negative real permittivity. It is known for a metal slab bounded by semi-infinite dielectrics that only TM modes may be supported by the structure. It follows for a mode propagating in the z direction, only the $E_y$, $H_x$ and $E_z$ fields exist. Further details of the optical simulator or solution to this problem attention is directed to WO 2001/048521 or U.S. Pat. No. 6,442,321.

Figure 4:
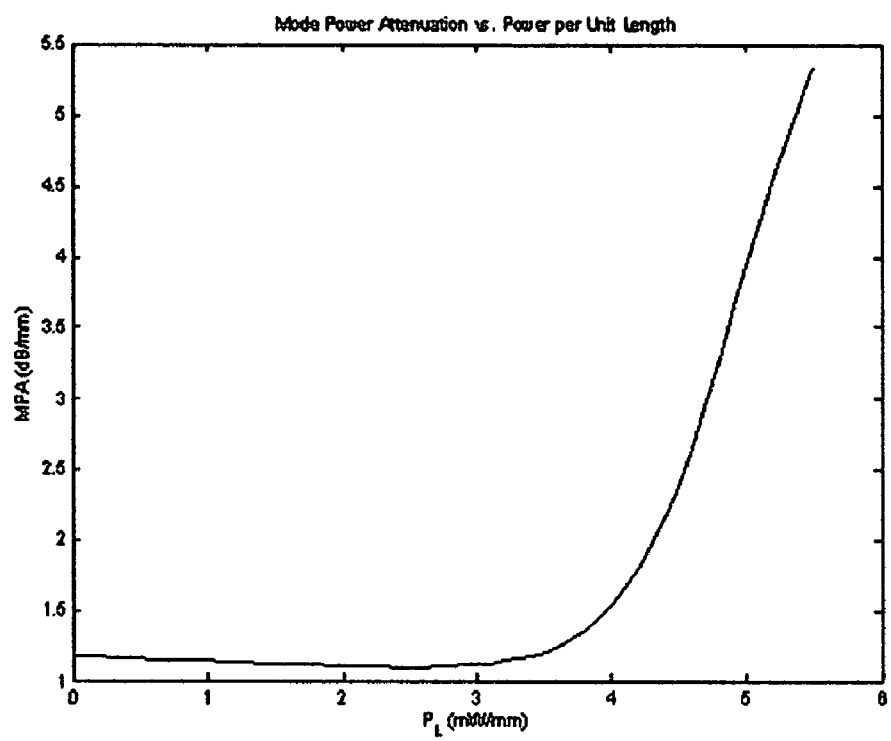
FIG. 4 represent the mode power attenuation (MPA) for the $s_n$ mode as a function of the electrical power per unit length consumed by the waveguide heater.
Figure 5:
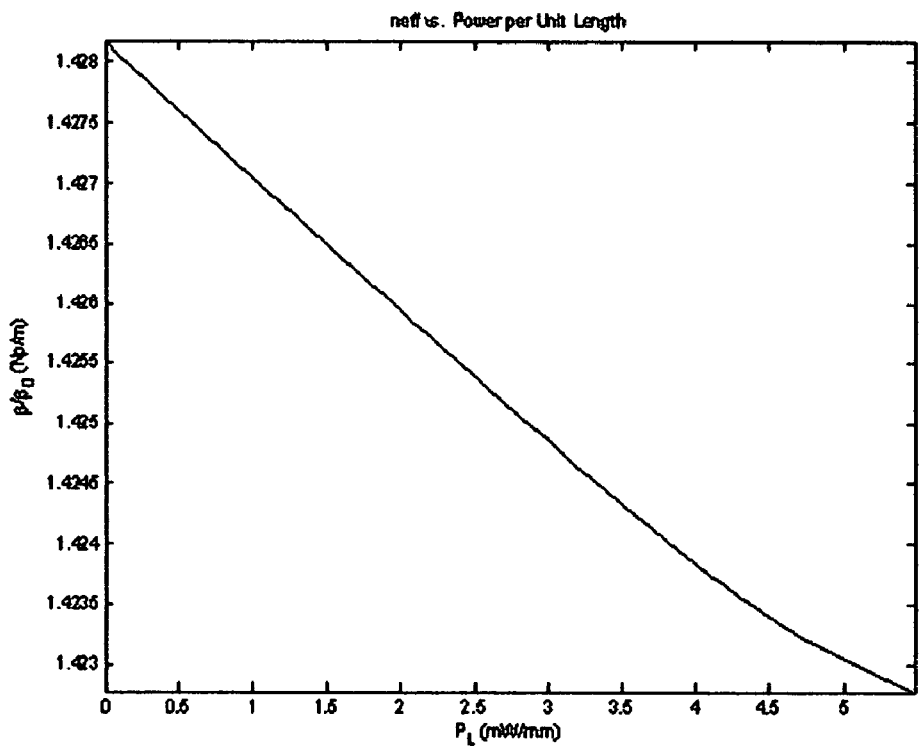
FIG. 5 shows the effective refractive index of the $s_b$ mode as a function of the electrical power per unit length consumed by the waveguide heater.
Figure 6:
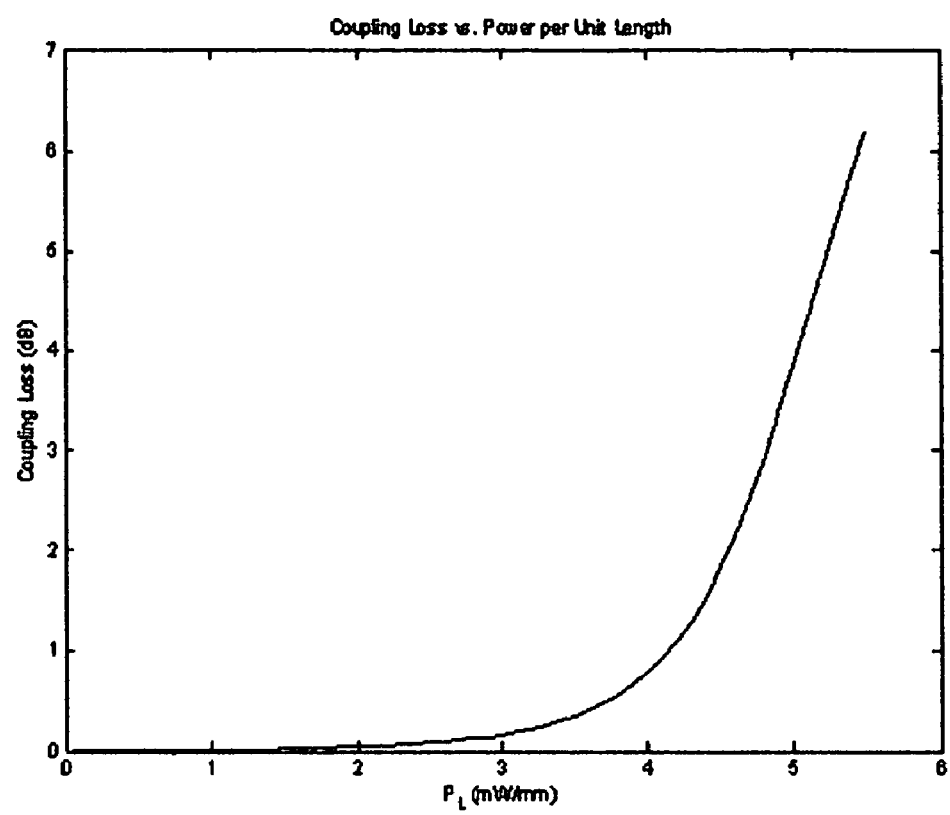
FIG. 6 shows the coupling loss between the $S_b$ mode of a non-heated waveguide and the same mode for a heated waveguide with the indicated electrical power per unit length consumed by the waveguide heater on the graphic.

The results of the optical simulations are shown in FIGS. 4–8. FIG. 4 shows the mode power attenuation (MPA) of the $s_b$ mode as a function of consumed electrical power per unit length by the metal strip. FIG. 5 shows the effective refractive index ($n_{eff}$) of the $s_b$ mode as a function of consumed electrical power per unit length by the metal strip. FIG. 6 shows the coupling loss between the $s_b$ mode of a non-heated and heated waveguide with the indicated electrical power per unit length consumed by the metal strip. For low power per unit length, the MPA is relatively constant, the coupling loss is small, and $n_{eff}$ changes almost linearly. It is in this regime that the MZVOA should be used because the power at the output of each branch of the MZ must be equal to obtain the best extinction ratio. As the power per unit length is further increased, the MPA and coupling loss start to vary rapidly. It is in this regime that the $s_b$ mode tends towards cutoff, which indicates that a substantial amount of the optical power starts to radiate out of the waveguide. It is in this regime that the SWGVOA is expected to be used.

Figure 7:
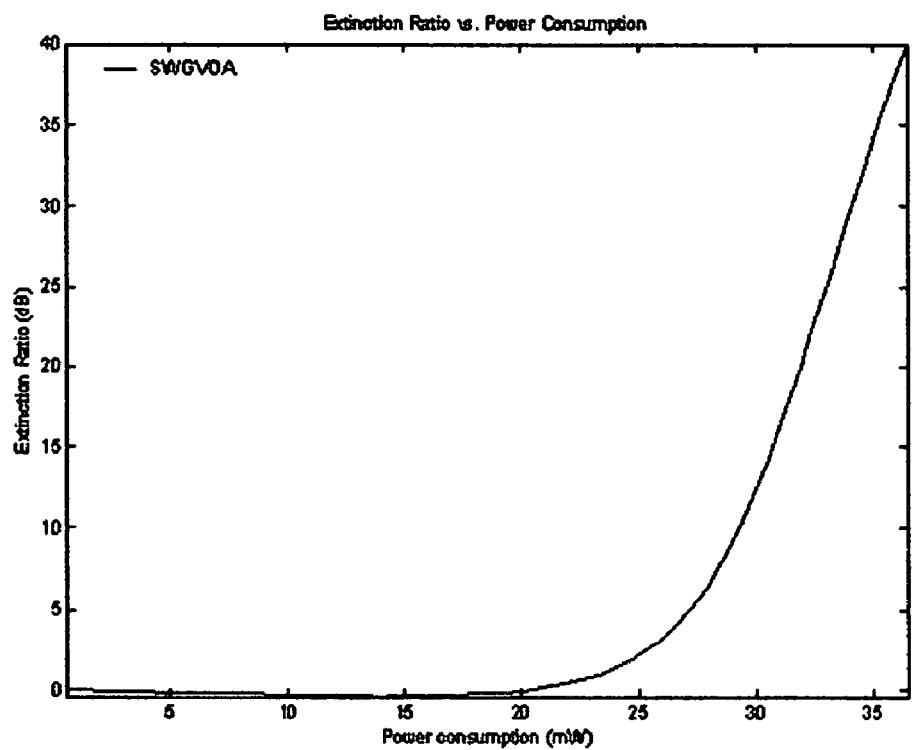
FIG. 7 shows the extinction ratio of a SWGVOA of 6.64 mm length as a function of applied power.

For the design of the SWGVOA, the device length is selected based on a trade-off between the extinction ratio and insertion loss. The extinction ratio of the SWGVOA is given by the following equation:

$$SWGER = L*(MPAH2 - MPAH) + 2*LC2 \qquad (8)$$

where SWGER, L, MPAH2, MPAH, LC2 are the extinction ratio, the heated length of the straight waveguide, the mode power attenuation of the heated waveguide, the mode power attenuation of the non-heated waveguide and the coupling loss of the heated to non-heated waveguide respectively. Without heating, the insertion loss of the SWGVOA is approximately:

$$SWGIL = L*MPAH + 2LC \qquad (9)$$

where LC is the fibre waveguide coupling loss. The total power dissipation is given by:

$$SWGP = L*P_L \qquad (10)$$

where SWGP and $P_L$ are the total power dissipated and power dissipation per unit length respectively. A length of the SWGVOA of 6.64 mm was chosen, which leads to an extinction ratio of 40 dB when 37 mW of power is supplied as shown by FIG. 7. The IL for the device is 6.17 dB for an 8 mn wide waveguide.

The design of the geometry of the MZVOA is based on the minimum bend radius, which is represented in FIG. 2B by R, that the waveguide can achieve without inducing significant bend losses. When the minimum radius is determined, a minimum MZ arm 204 separation represent 2B by S2 is selected such that thermal cross-talk becomes negligible. In fact there is a trade-off between the thermal cross-talk and the insertion loss of the device because the waveguide is lossy. If the arm separation S2 is increased the MZ will become longer, which is identified in FIG. 2B by TL and, hence, the insertion loss is increased.

Figure 8:
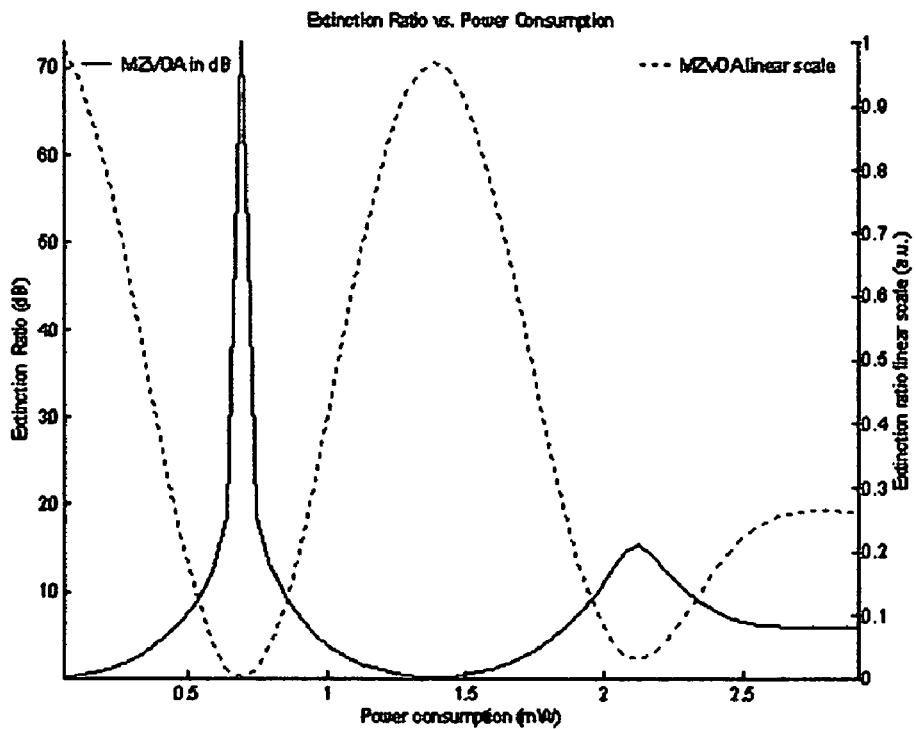
FIG. 8 shows the extinction ratio of an optical MZVOA as a function of applied power, the geometry of the MZVOA having been optimized to reduce cross-talk and insertion loss.

The extinction ratio of the MZ is given by $$MZER = -10\log\left(\frac{1}{4}\left(1 + 10^{\frac{-2\Delta}{10}} - 2*10^{\frac{-\Delta}{10}}\right)\right) \qquad (11)$$

where MZER and $\Delta$ are the extinction ratio of the MZ and the difference in attenuation between the two arms of the MZ (expressed in dB) respectively. Finally, the total power dissipation is given by:

$$MZP = HL*P_L \qquad (12)$$

where MZP, HL and $P_L$ are the electrical power consumption, heated length and power per unit length respectively. The maximum extinction predicted by theory is about 70 dB with a power consumption of 700 microwatts as shown in FIG. 8. The insertion loss is estimated to be less than 6.65 dB.

Demonstration vehicles comprising wageguide structures as shown in FIG. 1 were fabricated and tested. The metal strips comprising the waveguide were about 20 nm thick, the substrate consisted of 15 nm of silics on Si and the substrate consisted of a thick index matched layer of gelatinous polymer, chosen for ease of fabrication and electrical probing. Electrical probes were used to contact to the waveguide through the gelatinous superstrate via the contact pads 100 and the contacting arms 102. A thermoelectric cooler is used to thermally stablize the device near the index match point.

Figure 9:
FIG. 9 illustrates measured output of a SWGVOA for increasing levels of injected current.
Figure 9:
Figure 10:
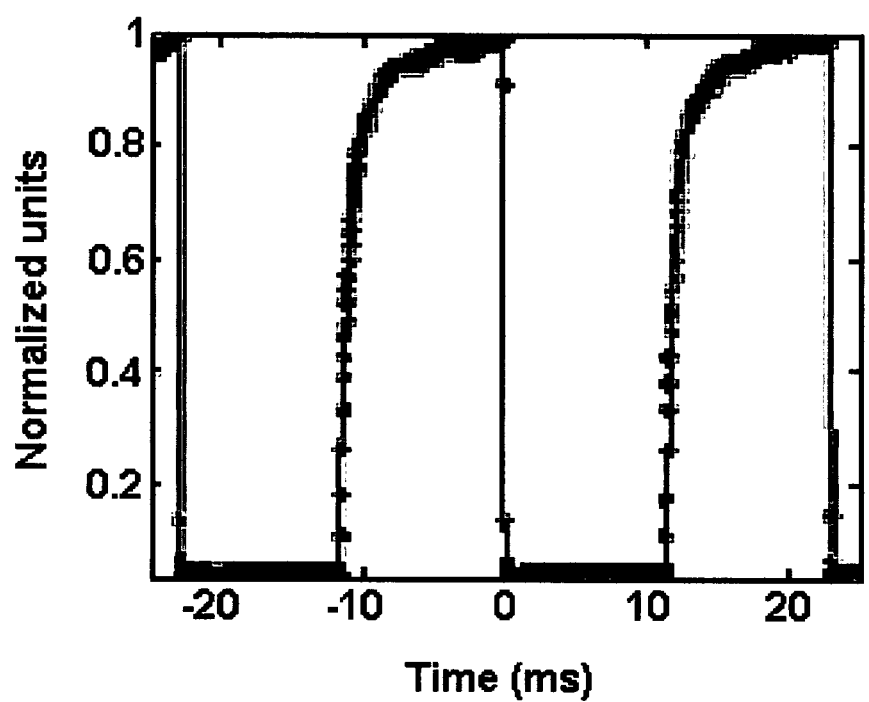
FIG. 10 illustrates measured rise and fall times of the SWGVOA of FIG. 9.

In this embodiment, the TO coefficient of the substrate is positive and about 10–5 per K. while the TO coefficient of the superstrate is negative and about 10–4 per K. the attenuation of the waveguide varies with the current flowing along the metal strip due to ohmic losses in the metal which heat the lower and upper claddings causing their indices to increase and decrease, respectively, thus inducing cut-off via index asymmetry. FIG. 9 shows the output of a 6 mm wide waveguide, having a heated length of 4.44 mm, at a free-space excitation waveguide of 1550 nm, captured using an infra red camera as the current flowing along the waveguide is increase. Deep extinction via radiation into the cladding is clearly visible. FIG. 10 shows typical rise (high to low attenuation) and fall (low to high attenuation) times of an example SWGVOA.

Other devices employing waveguide structures according to invention will now be described with reference to FIGS. 11 to 15.

Figure 11:
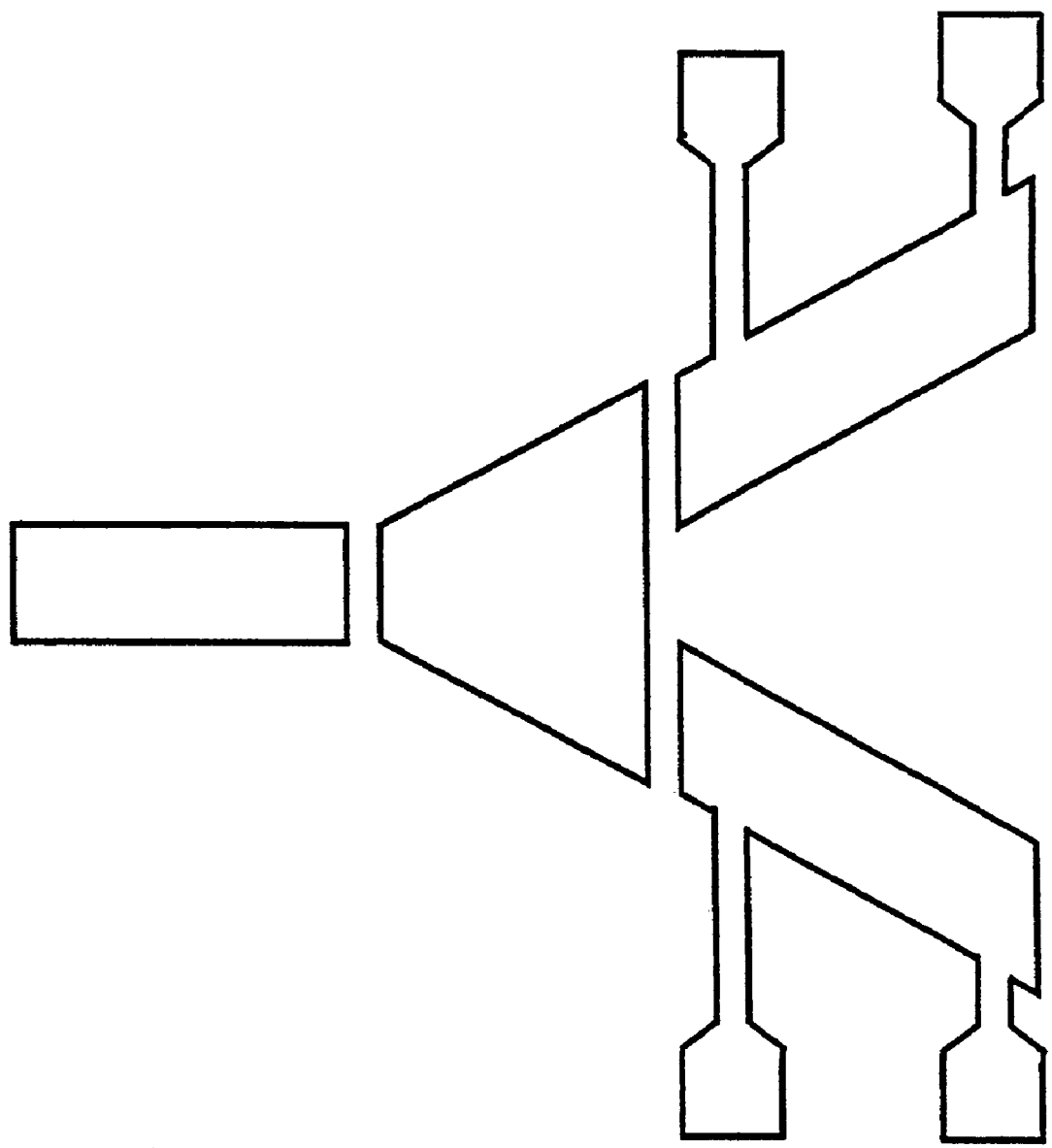
FIG. 11 illustrates a Y-junction employing the waveguide structure of FIG. 1.

FIG. 11 shows a two-way power splitter 110 formed from a trapezoidal section 106 with a straight section 100 coupled to its narrower and 112 and two angled sections 104 coupled side-by-side to its wider end 114. The distances between the input waveguide 100 and the narrower end 112 of the tapered section 106, and between the output waveguides 101 and the wider end 114 of the tapered section 106, d1, d2, and d3, respectively, should minimised. The angle between the output waveguides 104 is usually in the range of 0.5 to 10 degrees and their widths are usually similar. The offsets S1 and S2 between the output waveguides and the longitudinal centre line of the trapezoidal section 106 preferably are set to zero, but could be non zero, if desired, and vary in size. Ideally, however, the output sections 104 should together be equal in width to the wider end 114.

Offset S1 need not be equal to offset S2 but it is preferable that both are set to zero. The widths of the output sections 104 can be adjusted to vary the ratio of the output powers. The dimensions of the centre tapered section 106 are usually adjusted to minimise input and output reflections and radiation losses in the region between the output sections 104.

It should also be noted that the centre tapered section 106 could have angles that vary according to application and need not be symmetrical.

It is envisaged that the tapered section 106 could be replaced by a rectangular transition section having a width broader than the width of the input waveguide 100 so that the transition section favoured multimode propagation causing construction/destructive interference patterns throughout its length. The length could be selected so that, at the output end of the rectangular transition section, the constructive portions of the interference patter would be coupled into the different waveguides establishing, in effect, a 1-to-N power split. Such a splitter then would be termed a multimode interferometer-based power divider.

It should be appreciated that the device shown in FIG. 11 could also be used as a combiner by the tapered centre section 106 to form the output wave which would emerge from the straight waveguide section 100.

In either the Y splitter or the interferometer-based power divider, the number of arms or limbs 104 at the output could be far more than the two that are shown in FIG. 11.

It is also feasible to have a plurality of input waveguides. This would enable an N×N divider to be constructed. The dimensions of the transition section 106 then would be controlled according to the type of splitting/combining required.

An angled waveguide section 104 may be used to form an intersection between two straight waveguide section 100, with the dimensions adjusted for the particular appheation. It should be noted that, as shown in FIG. 11, the two straight sections 100 are offset laterally away from each other by the distances O1 and O2, respectively, which would be selected to optimise the couplings by reducing radiation and reflection losses. The angle of the trapezoidal section 104 will be a factor in determining the best values for the offsets O1 and O2. The sections 100 and 104 need not be counted directly together, but could be spaced by the distances d1 and d2 and/or coupled by a suitable transition piece that would make the junction more gradual (i.e., the change of direction would be more gradual).

Figure 12:
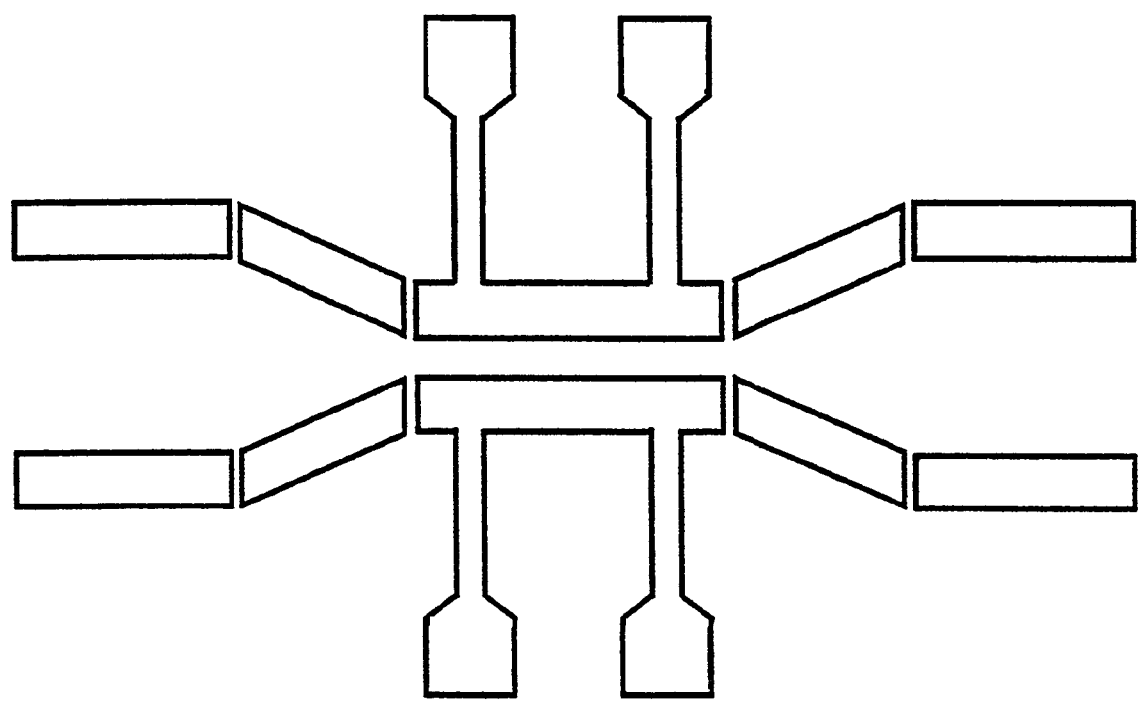
FIG. 12 illustrates a coupler employing the waveguide structure of FIG. 1.

FIG. 12 illustrates an edge coupler 139 created by placing tow strips 100" parallel to each other and in close proximity over a certain length. The separation Sc between the strips 100" could be from 1 μm (or less) to 20 μm and the coupling length Lc could be in the range of a few microns to a few dozen millimeters depending on the separation Sc, width and thickness of the strips 100", the materials used, the operating wavelength, and the level of coupling desired. Such a positioning of the strips 100" termed "edge coupling".

The gaps between the input and output of the waveguide sections shown would ideally be set to zero and a lateral offset provided between sections where a change of directions is involved. Curved sections could be used instead of the sections 104, 100 and 100".

Figure 13:
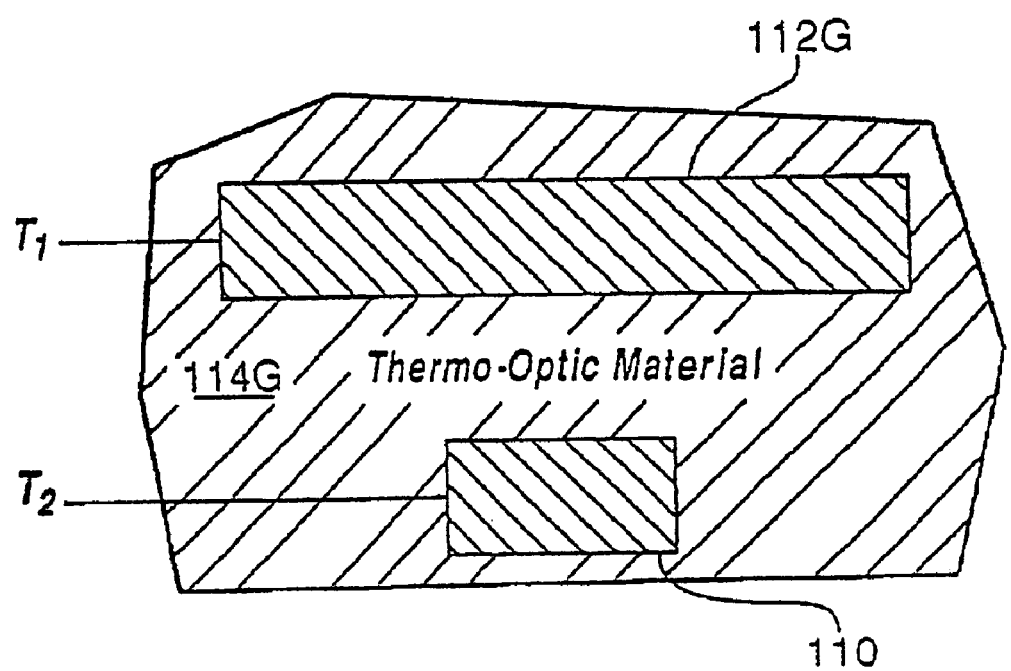
FIG. 13 is a schematic cross-sectional view of a thermo-optic modulator using the waveguide structure.

FIG. 13 depicts a thermo-optic modulator wherein the waveguiding strip 110 and a separate electrode 112G extend parallel to each other within the surrounding material. The waveguiding strip 110 and the overlying electrode 112G are maintained at temperatures $T_2$ and $T_1$ respectively. The dielectric material 114 surrounding the metal waveguide exhibits a thermo-optic effect. The temperature difference creates a thermal gradient in the dielectric portion 114G between the electrode 112G and the strip 110. The variation in the applied temperature thus induces the desired asymmetry in the waveguiding structure. The electrode 112G is placed far enough from the guiding strip 110 that optical coupling between the strip and the electrode is negligible.

Figure 14:
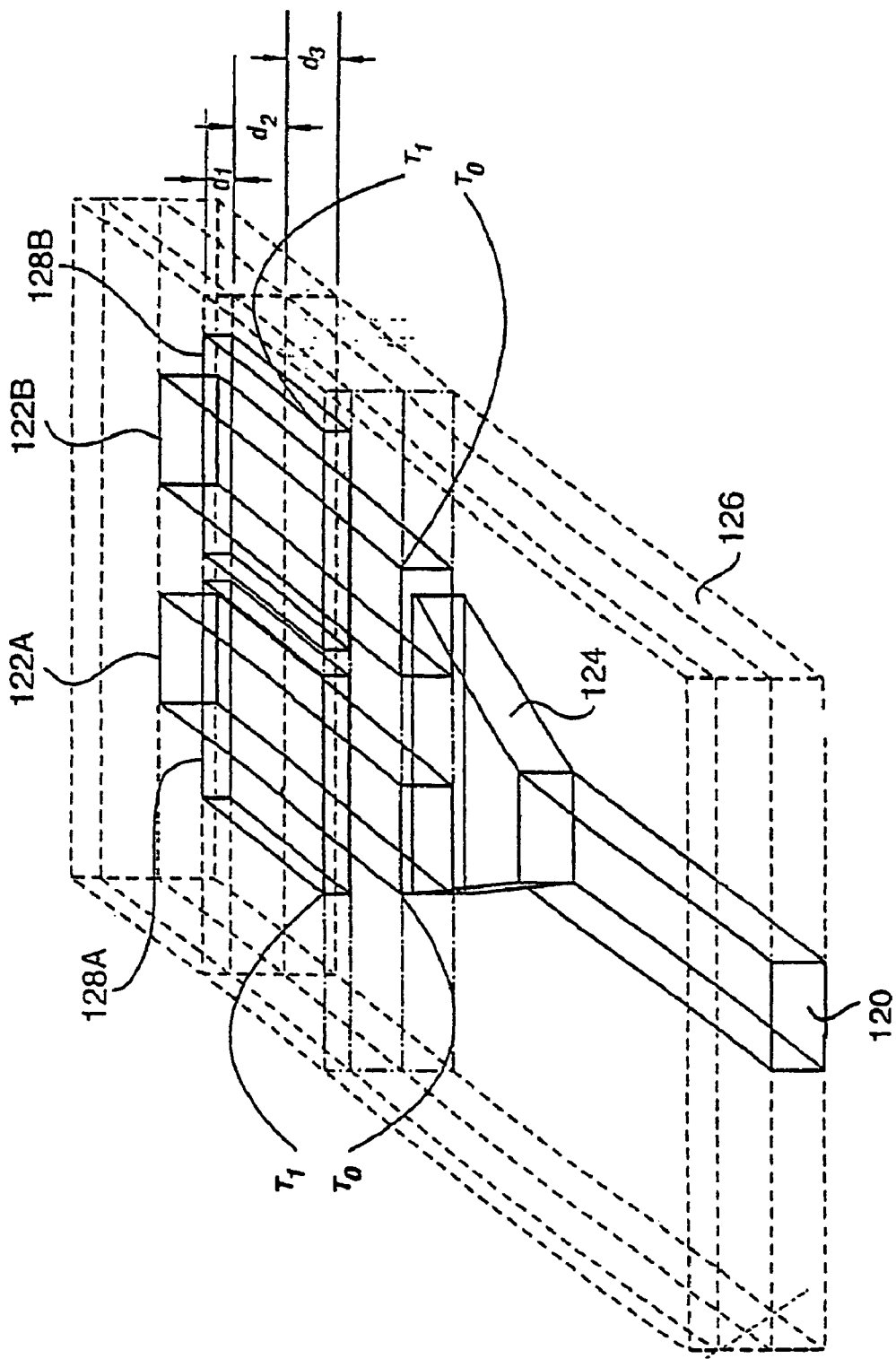
FIG. 14 is a schematic perspective view of a thermo-optic switch using the waveguide structure.

FIG. 14 shows a switch which includes a modulator similar to that shown in FIG. 13 in each of the branches of a Y-junction comprising waveguide strips 122A, 122B coupled in common to a strip 120 by way of a wedge structure 124. Electrodes 128A and 128B overlie the strips and are spaced from them. In the switch shown in FIG. 14, asymmetry is induced thermo optically by maintaining the metal strips 122A and 122B at temperature $T_0$ and the overlying electrodes 128A and 128B at temperatures $T_1$ and $T_2$, respectively.

Figure 15:
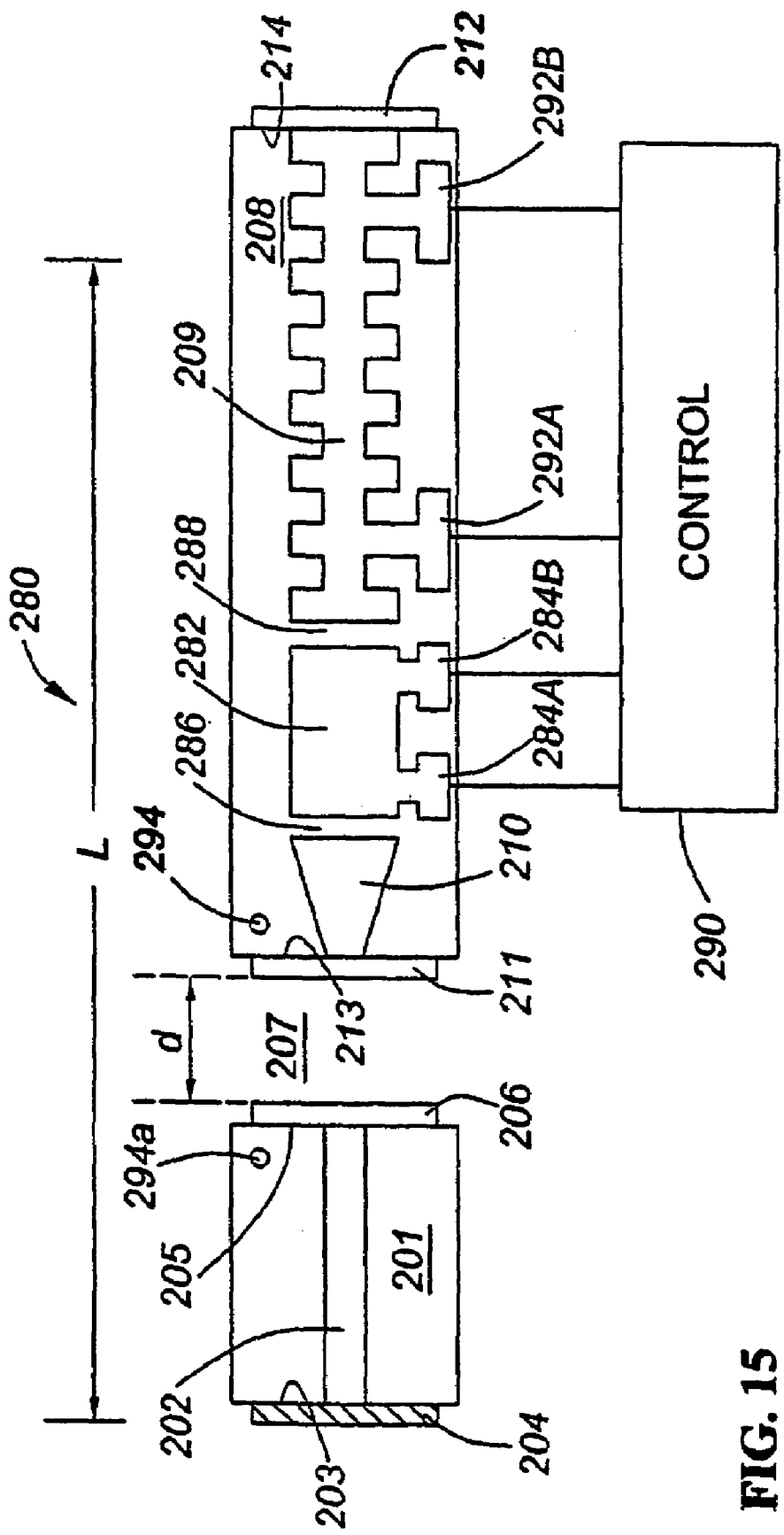
FIG. 15 is a schematic plan view of a tunable external cavity laser employing several sections of the waveguide structure.

FIG. 15 illustrates an external cavity laser having tuning means or varying the output wavelength of the laser. The tuning means takes the form of a phase shifting element adjacent one end of the grating that is closest to the active waveguide and control means for controlling the phase shifting element to vary the phase shift introduced thereby, said control means also being used for controlling the grating waveguide structure to vary the reflection characteristics of the grating waveguide structure thereby to vary the wavelength of the light emitted by the laser.

The phase shifting element may comprise a waveguide structure formed by a thin strip of material having a relatively high free charge carrier density surrounded by material having a relatively low free charge carrier density, the strip having finite width (w) and thickness (t) with dimensions such tat optical radiation having a wavelength in a predetermined range couples to the strip and propagates along the length of the strip as a plasmon-polariton wave.

The portion of material may be thermo-optic and the control means be arranged to pass a current through the strip of the phase shifter and the strips of the grating waveguide structures and/or through at least one heater electrode extending alongside said strips, to heat the material surrounding the strips to vary an electromagnetic property. Alternatively, the portion of material may be electro-optic and the control means arranged to apply an electric field thereto, with a second portion of said material therebetween, the control means supplying a voltage between the electrode and the strips to vary an electromagnetic property of the second portion of material.

The wavelength tunability of the external-cavity laser 280 is achieved by exploiting the materials properties of the plasmon-polariton grating chip 208 and the architecture of the plasmon-polariton grating 209, for example using thermo-optic or electro-optic effects.

Heat can be applied to the plasmon-polariton gratings by using external heating elements brought into close proximity to the plasmon-polariton grating e.g. one or more suitably resistive electrodes extending alongside it. The plasmon-polariton grating can also be used as the heating element by applying a current through it via contacts 292A and 292B as shown in FIG. 15 if it is designed as a continuous metal.

An advantage of thermo-optic devices embodying the present invention is that the cores of the waveguides, i.e., the strips of finite width of material having a high charge carrier density, say a metal, not only provide a waveguiding capability, but simultaneously may be used as: a) an ohmic beating element by injecting current through it via optically non-invasive electrical contacts, and b) a means of sensing the temperature directly in the active region of the device since metals typically have a high thermal conductivity and a temperature dependent resistivity. Since external heaters and temperature sensors are not needed, device fabrication is simplified and consequently costs are reduced. Moreover, because the optical radiation propagates along the strip whose temperature is changing, there is no intervening poor conductor, which improves response times and power consumption.

Thus, the plasmon-polariton wave propagating along the strip has an electric field distribution peaking at the core/cladding interfaces of the waveguide and decaying radially away from the core. The temperature distribution in the cladding, due to heating of the waveguide via the passage of current therein, is very similar to that of the plasmon-polariton wave, also peaking at the core and decaying radially outward. Consequently, when the waveguide is used as a heater, the heat influences the plasmon-polariton wave efficiently; in fact, the overlap between the thermal distribution and the electric field distribution of the plasmon-polariton wave is almost optimal. For this reason, the power required to achieve a given thermo-optic function is reduced compared with previously-known devices.

Since the source of heat is the waveguide heater, and the heater is comprised of high thermal and electrical conductivity material, and the heater coincides with the plasmon-polariton wave, then very little thermal diffusion has to take place before affecting the wave. Thus heating the waveguide affects the wave quickly. When the current passing though the waveguide heater is cut, the heat must diffuse out of the waveguide region into the surrounding materials and heat sink, which is a slower process. Thus, the cooling process affects the wave more slowly than the heating process.

The asymmetry in the rise and fall times of the device, as described above, can be minimized by using surrounding material(s) with a high thermal conductivity. Also, a substrate with a high thermal conductivity placed between the surrounding material and the heat sink could be used to evacuate the heat more rapidly. Since the waveguide heater is thermally very efficient, the power consumption of the device does not increase significantly for higher thermal conductivity cladding materials.

It is known that the resistance of a metal changes with temperature. The resistance can be measured for a few temperatures and, hence, the metal can be temperature calibrated. Conversely, knowing the resistance of a metal should give the temperature. Because the waveguide is made of metal, it is possible to determine its temperature by measuring its resistance. This can be done very easily by connecting an ohm-meter to the same electrodes that are used to inject current to heat the waveguide.

Advantageously, the strip may be metal. Metal waveguides are well suited to thermo optic devices since the metal strip comprising the core of the waveguide can be used to heat the optical region ensuring excellent thermal-optical overlap, in contrast to typical thermo-optic devices using dielectric waveguides, which need separate cores and heaters. Embodiments of the invention having metal waveguide strips generally exhibit faster response times, higher efficiency, lower drive power, lower operating costs, and since the devices are easy to fabricate, lower acquisition costs.

Application of the invention is not limited to the above-described embodiments. A skilled person would be able to apply the inventive concepts to the design many kinds of thermo-optic device. Thus, the invention comprehends many thermo-optic devices, including: phase shifters, variable optical attenuators, modulators, tunable gratings, tunable couplers, tunable filters, tunable add-drop multiplexers and demultiplexers, switches, polarization controllers and polarization mode dispersion compensators.

More specifically, for example, connector arms can be applied to a Bragg grating as shown in FIG. 15, to either or both branches of a coupler as shown in FIG. 12, or to either or both branches of a Y-junction as shown in FIG. 11, and current passed along the metal strip between a chosen pair of connector arms to thermally alter the device's response. In the case of a Bragg grating a tunable filter is achieved, in the case of a coupler a tunable coupling factor is achieved, and in the case of a Y-junction a space switch is achieved with the light emerging from the branch having the highest index (heated branch in the case of positive TO coefficient surrounding materials, non-heated branch in the case of negative TO coefficient surrounding materials).

Using the metal strip comprising the core of the waveguide to heat the surrounding cladding material leads to advantages. Firstly, the claddings are heated from the inside out versus typical prior art devices which are heated from the outside in. In the case where the substrate and superstrate are composed of the same material, and the thermal design of the device is symmetrical, then this leads to symmetrical heating of the mode, which is desirable in the design of a phase shifter. Secondly, the heating element being the same element as the core of the waveguide eliminates the need for an adjacent element which could perturb the optical mode. Thirdly, the thermal and optical spatial distributions are similar, both peaking at the metal strip and decreasing exponentially away, leading to excellent overlap between the heated region and the optical mode. In fact, the optical mode field exhibits a maximum at the same location as the maximum temperature.

Devices may be interfaced to dielectric waveguides in an end-fire manner. This entails butt-coupling for example a single mode fibre to the input and output ends of the device, ensuring good overlap between the mode of the fibre and the plasmon-polariton wave propagating along the metal waveguide. Alternatively, broadside coupling could be used by means of, for example, a grating.

The temperature of the metal strip can be controlled by any one of the following means, possibly in combination: i) by passing a current along the strip, ii) by connecting the strip to a thermal source or sink, iii) by inducing a current via an applied magnetic field, iv) by inducing a current via an applied electric field, v) by inducing a current via an applied electromagnetic field, vi) by propagating another plasmon-polariton wave along the strip. Specific details will not be provided here since a person skilled in the art will be able to fabricate such devices without indue experimentation.

In case vi), the other plasmon-polariton wave can have a wavelength different from the first, preferably shorter, such that it suffers a higher propagation loss and thus is more effective at heating the strip.

The inventive concept can of course also be extended to more sophisticated devices comprising many of the above-mentioned thermally active elements.

Although embodiments of the invention have been described and illustrated in detail, it is to be clearly understood that the same are by way of illustration and example only and not to be taken by way of the limitation, the spirit and scope of the present invention being limited only by the appended claims.

The contents of International patent application number PCT/DK2003/000579 published under number WO 2004/023177 A2 and A3 are incorporation herein by reference.

REFERENCES

[1] P. Berini, "Plasmon-pulariton waves guided by thin lossy metal films of finite width: Bound modes of symmetric: strictures", Physical Review B, vol. 61, no. 15, p. 10454, 2000.
[2] P. Berini, "Plasmon-pulariton waves guided by thin lossy metal films of finite width: Bound modes of asymmetric structures", Physical Review B, vol. 63, p. 125417, 2001.
[3] P. Berini, "Plasmon-polariton modes guided by a metal film of finite width", Optics Letters, vol. 24, no. 15, 1999.
[4] P. Berini, "Plasmon-polariton modes guided by a metal film of finite width bounded by different dielectrics", Optics Express, vol 7, no. 10, p. 320, 2000.
[5] R. Charbonneau, P. Berini, "Experimental observation of plasmon-polariton waves supported by a thin metal film of finite width". Optics Letters, vol. 25, no. 11, 2000
[6] R. Charbonneau, P. Berini, "Long-Range Plasmon-Polariton Wave Propagation in Thin Metal Films of Finite-Width Excited Using an End-Fire Technique". Proceedings of SPIE, vol. 4057, p. 534, 2000
[7] Q. Lai et Al., "Low-Power Compact 2×2 Thermooptic Silica-on-Silicon Waveguide Switch with Fast Response", IEEE Photonics Technology Letters, vol. 10, no. 5, May 1995.
[8] R. Kasaltara et Al., "Low-Power Consumption Silica-Raced 2×2 Thormooptie Switch Using Trenched Silicon Substrate", IEEE Photonics Technology Letters, vol 11, no. 9, September 1999.
[9] Y. Hida et Al., "Polymer Waveguide Thermooptic Switch with Low Electric Power Consumption at 1.3 um", IEEE Photonics Teelmulody Letters, vol. 5, no. 7, July 1993.
[10] B. A. Moller et Al., "Silica-Waveguide Thermooptic Phase Shifter with Low Power Consumption and Low Lateral Heat diffusion", IEEE Photonics Technology Letters, vol. 5, no. 12, December 1993.
[11] A. Sugita et Al., "Bridge-Suspended Silica-Waveguide Thermo-Optic Phase Shifter and Its Application to Mach-Zehnder Type Optical Switch", IFICE, vol.E 73, no.1, January 1990.
[12] Sang-Shin Lee et Al., "Variable Optical Attenuator Basod on a Cutoff Modulator with Tapered Waveguides in Polymers", Journal of Lightwave Technology, vol. 17, no. 12, December 1999.
[13] M. Paniecie, P. Flinn, R. Reitenberger, "Scanning probe microscopy studies of electromigration in electroplated Au wiles", J.Appl.Phys., 73(12), 15 Jun. 1993
[14] Gorachand Ghosh, "Temperature Dispersion of Refractive Indexes in Some Silicate Fiber Glasses", IEEE Photonics Technology Letters, vol.6, no. 3, March 1994
[15] Gorachand Ghosh, "Tempernturo-Dependent Sellmeier Coefficients and Chromatic Dispersions for Some Optical Fiber Glasses", Journal of Lightwave Technology, vol. 12, no.8, August 1994
[16] Gorachand Ghosh, "Sellmeier coefficients and dispersion of thermo-optic coefficients for some optical glasses", Applied optics, vol. 36, no.7, 1 Mar. 1997
[17] Edward D. Palik, Gorachand Ghosh, "Electronic Handbook of Optical Constants of Solids", Academic Press, 1999
[18] Fano, U., J. Opt. Soc. Am., Vol. 31, pp. 213, 1941
[19] Zenneck, J., Ann. Phys., Vol. 23, pp. 846, 1907
[20] Burke, J. J., Stegeman, G. J., Tamir, T., "Surface-polariton-liike waves guided by thin, lossy metal films", Physical Review pp. 5186 5201, Vol 33 (No.8), Apr. 15, 1986.
[21] Economou, E. N., "Surface Plasmons in Thin Films", Physical Review, Vol. 182 (No.2), pp. 539–554, 10 Jun. 1969
[22] Yang, F., Sambles, J. R., Bradberry, G. W., "Long-range surface modes supported by thin films", Physical Review B., pp. 5855–5872, Vol. 44 (No. 11), 15 Sep. 1991.
[23] Boardman, A. D., "Eiectromngrwtic xurface modes". John Wiley & Sons, Chichester, 1982.
[24] Ashcroft, N. W., Mcunio, N. D., "Solid State Physics,", Harcourt, Inc., Orlando, FL, 1976, Chapter 1.
[25] U.S. Pat. No. 6,434,318 B1 Date of Patent: Aug. 13, 2002
[26] U.S. Pat. No. 6,377,716 B1 Date of Patent: 23, 2002
[27] U.S. Pat. No. 6,507,681 B1 Date of Patent: Jan. 14, 2003
[28] U.S. Pat. No. 5,173,956 Date of Patent: Dec. 22, 1992
[29] U.S. Pat. No. 2002/0018636 A1 Pub. Date; Feb. 14, 2002
[30] U.S. Pat. No. 2002/0176687 A1 Pub. Date: Nov, 28, 2002
[31] U.S. Pat. No. 2002/0037129 A1 Pub. Date: Mar. 28, 2002
[32] U.S. Pat. No. 5,418,868 Date of Patent: May 23, 1995
[33] U.S. Pat. No. 6,236,774 B1 Date of Patent: May 22, 2001
[34] U.S. Pat. No. 6,163,633 Date of Patent: Dec. 19, 2000
[35] WO 2001/048521
[36] U.S. Pat. No. 6,442,321
[37] U.S. Pat. No. 2003/0059147 A1 Pub. Date: Mar. 27, 2003

The invention claimed is:

1. A waveguide structure formed by a thin strip of material having a relatively high free charge carrier density surrounded by material having a relatively low free charge carrier density, the strip having finite width and thickness with dimensions such that optical radiation having a wavelength in a predetermined range couples to the strip and propagates along the length of the strip as a plasmon-polariton wave, and heater means for causing heating of the strip to vary propagation of said optical radiation.

2. A waveguide structure according to claim 1, further comprising means for monitoring its temperature.

3. A waveguide structure according to claim 1, wherein the heater comprises connectors for coupling a current source to the strip for passing a current through the strip to cause heating thereof.

4. A waveguide structure according to claim 3, farther comprising means for monitoring its temperature.

5. An optical device comprising at least one of the group consisting of phase shifters, variable optical attenuators, modulators, tunable gratings, tunable couplers, tunable filters, tunable add-drop multiplexers and demultiplexers, switches, polarization controllers and polarization mode dispersion compensator, and comprising a waveguide structure formed by a thin strip of material having a relatively high free charge carrier density surrounded by material having a relatively low free charge carrier density, the strip having finite width and thickness with dimensions such that optical radiation having a wavelength in a predetermined range couples to the strip and propagates along the length of the strip as a plasmon-polariton wave, and heater means for causing heating of the strip to vary propagation of said optical radiation.

6. An optical device comprising at least one of the group consisting of phase shifters, variable optical attenuators, modulators, tunable gratings, tunable couplers, tunable filters, tunable add-drop multiplexers and demultiplexers, switches, polarization controllers and polarization mode dispersion compensators, and comprising a waveguide structure a waveguide structure formed by a thin strip of material having a relatively high free charge carrier density surrounded by material having a relatively low free charge carrier density, the strip having finite width and thickness with dimensions such that optical radiation having a wavelength in a predetermined range couples to the strip and propagates along the length of the strip as a plasmon-polariton wave, and means for monitoring the temperature of the strip.

7. A waveguide structure formed by a thin strip of material having a relatively high free charge carrier density surrounded by material having a relatively low free charge carrier density, the strip having finite width and thickness with dimensions such that optical radiation having a wavelength in a predetermined range couples to the strip and propagates along the length of the strip as a plasmon-polariton wave, and means for monitoring the temperature of the strip.

* * * * *